United States Patent
Iwasa et al.

(10) Patent No.: US 11,885,905 B2
(45) Date of Patent: Jan. 30, 2024

(54) RADAR APPARATUS AND METHOD FOR DETERMINING RANGE SIDE LOBE

(71) Applicant: PANASONIC INTELLECTUAL PROPERTY MANAGEMENT CO., LTD., Osaka (JP)

(72) Inventors: Kenta Iwasa, Tokyo (JP); Hidekuni Yomo, Kanagawa (JP); Tomohiro Yui, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 150 days.

(21) Appl. No.: 17/479,374

(22) Filed: Sep. 20, 2021

(65) Prior Publication Data

US 2022/0003835 A1 Jan. 6, 2022

Related U.S. Application Data

(63) Continuation of application No. PCT/JP2020/013189, filed on Mar. 25, 2020.

(30) Foreign Application Priority Data

Mar. 26, 2019 (JP) ................. 2019-059166

(51) Int. Cl.
*G01S 7/292* (2006.01)
*G01S 7/288* (2006.01)
*G01S 13/28* (2006.01)

(52) U.S. Cl.
CPC ............ *G01S 7/2921* (2013.01); *G01S 7/288* (2013.01); *G01S 13/288* (2013.01)

(58) Field of Classification Search
None
See application file for complete search history.

(56) References Cited

U.S. PATENT DOCUMENTS

2016/0282450 A1  9/2016 Kishigami et al.
2017/0307744 A1  10/2017 Loesch et al.

FOREIGN PATENT DOCUMENTS

JP   2013-221916 A   10/2013
JP   2016-180721 A   10/2016
JP   2017-534881 A   11/2017

OTHER PUBLICATIONS

JP2013221916 translation (Year: 2013).*

(Continued)

*Primary Examiner* — Whitney Moore
(74) *Attorney, Agent, or Firm* — GREENBLUM & BERNSTEIN, P.L.C.

(57) ABSTRACT

Provided is a radar apparatus including: an estimation circuit; and a processing circuit. The estimation circuit outputs a plurality of pieces of data each including information in which a distance to a target and a direction to the target are estimated based on a reception signal including a reflected wave that is a radar signal reflected by the target. The processing circuit determines a range side lobe component in the target based on the estimated distance and the estimated direction of one or more pieces of data selected from the plurality of pieces of data.

9 Claims, 17 Drawing Sheets

(56) References Cited

OTHER PUBLICATIONS

Japanese Notice of Reasons for Refusal (English Language Translation), dated Jul. 5, 2022, by the Japan Patent Office (JPO), in Japanese Patent Application No. 2019-059166.

Kiyotaka Kobayashi et al., "Advanced Code Sequences Design for Pedestrian Detection in Millimeter-Wave Pulse-Compression Radar System", Asia Pacific Microwave Conference Proceedings, pp. 682-684, 2012.

Takashi Yoshida, "Radar Engineering Revised Edition", Taylor Distribution, The Institute of Electronics, Information and Communication Engineers, pp. 134-135 (English Language Translation), 1996.

James A. Cadzow, "Direction-of-Arrival Estimation Using Signal Subspace Modeling", IEEE Transactions on Aerospace and Electronic Systems, vol. 28, No. 1, pp. 64-79, 1992.

International Search Report, dated Jun. 23, 2020 by the Japan Patent Office (JPO), in International Application No. PCT/JP2020/013189.

\* cited by examiner

RADAR APPARATUS AND METHOD FOR DETERMINING RANGE SIDE LOBE

TECHNICAL FIELD

The present disclosure relates to a radar apparatus and a method for determining a range side lobe.

BACKGROUND ART

Radar apparatuses that use radar transmission signals with short wavelengths, including microwaves or millimeter waves that provide high resolution, have recently been under study. Further, in order to improve safety outdoors, it is desired to develop radar apparatuses (hereinafter, referred to as "wide-angle radar apparatus") that detect vehicles as well as targets (also referred to as, for example, objects or target objects) including pedestrians in a wider angle range.

A radar apparatus in the related art transmits a radar transmission signal from a transmission antenna in a predetermined transmission period, receives a reflected wave signal, which is the radar transmission signal reflected by a target, with a reception antenna, and processes a reception signal, thereby estimating the range (in other words, a distance) to the target, the relative velocity of the target with respect to the radar apparatus, the direction to the target, and the like.

A reception signal of a radar apparatus includes a main lobe corresponding to a target, and side lobes (also referred to as "range side lobe") that occur before and after (in other words, in the vicinity of) a target in a range axis (in other words, a distance axis) direction.

CITATION LIST

Patent Literature

PTL 1

Japanese Unexamined Patent Application Publication (Translation of PCT Application) No. 2017-534881

Non-Patent Literature

NPL 1

Taylor Distribution, Yoshida. "Radar Engineering Revised Edition", the Institute of Electronics, Information and Communication Engineers, pp. 134-135 (1996) (in Japanese)

NPL 2

Kiyotaka K, et al., "Advanced Code Sequences Design for Pedestrian Detection in Millimeter-Wave Pulse-Compression Radar System", Asia Pacific Microwave Conference Proceedings, pp. 682-683, 2012

NPL 3

Direction-of-arrival estimation using signal subspace modeling, Cadzow, J. A., Aerospace and Electronic Systems, IEEE Transactions on Volume: 28, Issue: 1, Publication Year: 1992, Page(s): 64-79

SUMMARY OF INVENTION

Technical Problem

A range side lobe may be a factor in causing a erroneous detection of a target in a radar apparatus.

Solution to Problem

Non-limiting and exemplary embodiments facilitate providing a radar apparatus and a method for determining a range side lobe which improve target detection performance.

A radar apparatus according to one embodiment of the present disclosure includes: an estimation circuit that outputs a plurality of pieces of data each including information in which a distance to a target and a direction to the target are estimated based on a reception signal including a reflected wave that is a radar signal reflected by the target; and a processing circuit that determines a range side lobe component in the target based on the estimated distance and the estimated direction of one or more pieces of data selected from the plurality of pieces of data.

It should be noted that general or specific embodiments may be implemented as a system, a method, an integrated circuit, a computer program, a storage medium, or any selective combination thereof.

Advantageous Effects of Invention

According to an exemplary embodiment of the present disclosure, target detection performance in a radar apparatus can be improved.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
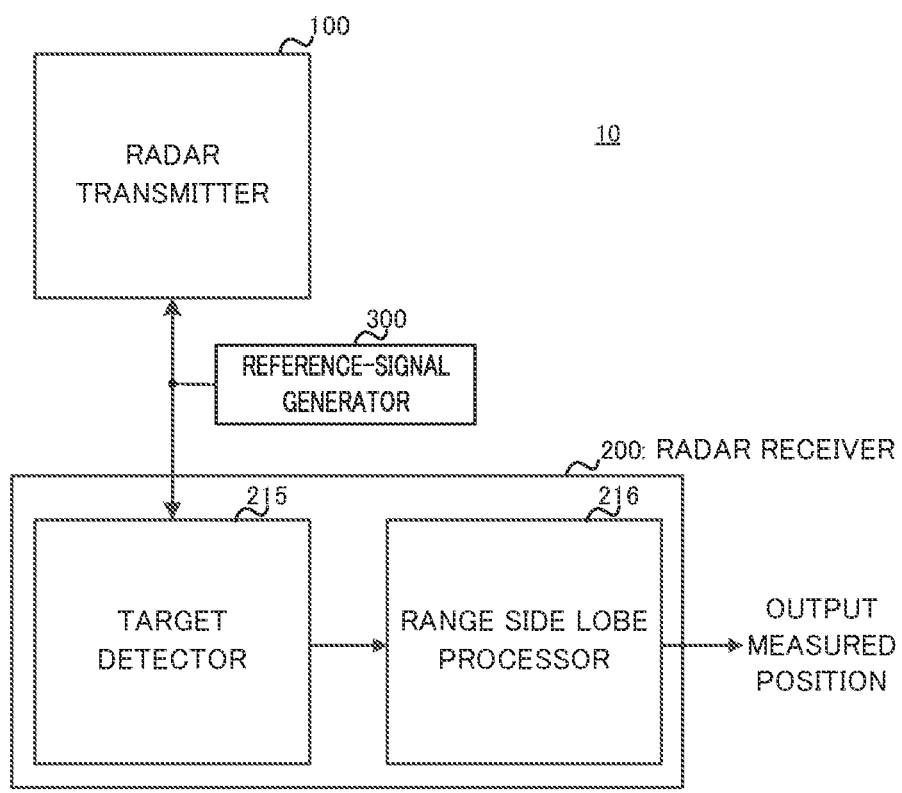
FIG. 1 is a block diagram illustrating a configuration example of a radar apparatus.

Examples of the radar apparatus include a pulse radar apparatus that repeatedly transmits (in other words, dispatches) phase-modulated, amplitude-modulated or frequency-modulated pulse waves. Further, a reception signal of a pulse radar apparatus that detects vehicles or pedestrians in a wider angle range is likely to be a mixed signal of a plurality of reflected waves from a target (for example, a vehicle) existing at a close distance (for example, less than a predetermined distance) and a target (for example, a pedestrian) existing at a long distance (for example, equal to or longer than a predetermined distance).

The pulse radar apparatus, for example, estimates the distance to a target based on a delay-time signal of a reflected wave obtained by demodulation of a modulated pulse wave included in a reception signal. Further, the pulse radar apparatus, for example, estimates the relative velocity of the target with respect to the pulse radar apparatus by Doppler analysis of a reflected wave.

Further, a wide-angle radar apparatus capable of estimating one or both of an azimuth angle and an elevation angle can perform two-dimensional positioning or three-dimensional positioning of a target. Configuration examples of the wide-angle radar apparatus include the following two configurations.

The first configuration transmits a radar wave by mechanically or electronically scanning a pulse wave or a modulated wave by using a directional beam with a narrower angle (for example, with a beamwidth of approximately several degrees) than an angle to be detected, and receives a reflected wave by using a directional beam with a narrow angle. With this configuration, more scanning is performed for improving resolution so that follow-up capability for a target moving at a higher speed is likely to deteriorate, for example.

The second configuration receives a reflected wave by an array antenna formed by using a plurality of antennas (antenna elements), and uses a method (direction of arrival (DOA) estimation) of estimating an angel of arrival of the reflected wave by a signal processing algorism based on a reception phase difference with respect to an element interval (antenna interval). With this configuration, even when a transmission-beam scanning interval in a transmission branch is thinned out, the angle of arrival can be estimated in a reception branch so that a shortened scanning time can be achieved and follow-up capability for a target improves in comparison with the first configuration. Examples of the direction-of-arrival estimation method include a Fourier transform based on a matrix calculation, a Capon method and a linear prediction (LP) method based on an inverse matrix calculation, and multiple signal classification (MUSIC) and estimation of signal parameters via rotational invariance techniques (ESPRIT) based on an eigenvalue calculation.

Further, the radar apparatus has a configuration (also referred to as "multiple input multiple output (MIMO) radar") in which a transmission branch as well as a reception branch include a plurality of antenna elements (an array antenna) and beam scanning is performed by signal processing using the transmission and reception array antenna. The MIMO radar, for example, transmits signals multiplexed by using time division, frequency division, or code division from a plurality of transmission antennas, receives signals reflected by nearby objects with a plurality of reception antennas, and separates and receives the multiplexed signals from the respective reception signals.

Further, by devising the arrangement of the antenna elements of the transmission and reception array antenna in the MIMO radar, it is possible to form a virtual reception array antenna (hereinafter referred to as "virtual reception array") including antenna elements the number of which is equal to the product of the number of transmission antenna elements and the number of reception antenna elements at the maximum. In the MIMO radar, it is possible to retrieve a propagation path response expressed by the product of the number of transmission antennas and the number of reception antennas. By appropriately arranging an transmission and reception antenna interval in the MIMO radar, it is possible to expand the effective aperture length of the array antenna with a small number of elements and improve the angular resolution.

Here, in a case where range side lobes occur before and after a target in a range axis direction, the radar apparatus may erroneously detect the range side lobes as the target in regions before and after the target.

Further, in a case where another target exists in range side lobe regions before and after a target, the reception quality (for example, signal to interference ratio (SIR)) with respect to the other target may deteriorate due to the range side lobes. For example, in a case where the other target is a reflection object (for example, a pedestrian) having a low reflection level in comparison with a reflection object such as a vehicle, it may be difficult for the radar apparatus to detect the other target due to the range side lobes before and after the target. Further, even when the other target is correctly detected by the radar apparatus, the probability of erroneous detection in which the other target is determined as an erroneous target in post-processing of target detection processing (for example, clustering, tracking, object identification or the like) is likely to increase by being affected by the range side lobes.

To address the above, for example, the following methods have been proposed as a method of reducing range side lobes.

For example, there is a method in which range side lobes are reduced by using a window function when a modulated signal is pulse-compressed in a radar receiver in a radar apparatus using a frequency chirp signal (for example, see NPL 1). The window function is selected, for example, depending on a range side lobe level. Further, for example, there is a method in which range side lobes are reduced by using a complementary code in a radar apparatus using a phase-modulated or amplitude-modulated coded pulse (low-range side lobe characteristics) (for example, see NPL 2).

However, the use of a window function may cause deterioration of distance resolution or reduction (in other words, loss) of a main lobe level due to an expanded main lobe width (main lobe characteristics). There is a trade-off relation between these main lobe characteristics and low-range side lobe characteristics due to a window function. Further, the method in which range side lobes are reduced during modulation/demodulation by using a window function or a complementary code may cause a deterioration in a range side lobe-reducing effect in an environment where a non-linear signal is generated in a transceiver of the radar apparatus.

As described above, the method in which range side lobes are reduced in modulation/demodulation during pulse compression in a radar apparatus that performs the pulse compression may not sufficiently reduce the range side lobes and a target may be erroneously detected in the radar apparatus.

Accordingly, in one embodiment of the present disclosure, a method in which range side lobes are reduced regardless of modulation/demodulation of a radar apparatus and target detection performance is improved will be described, for example. For example, in the embodiment of the present disclosure, a range side lobe component in a target detection result (in other words, a target estimation result) of the radar apparatus is determined and removed.

Embodiments according to an exemplary embodiment of the present disclosure will be described in detail hereinbelow with reference to the drawings. In the embodiments, the same components are given the same reference signs, and descriptions thereof will be omitted because of redundancy.

A configuration of a radar apparatus will be described before determination and removal processing of a range side lobe component are described.

Hereinafter, a configuration of a MIMO radar will be described in which, for example, a plurality of transmission antennas is switched in time division by using frequency-modulated pulse compressed waves, time-division multiplexed different radar transmission signals are transmitted, and each radar transmission signal is separated and reception processing is performed in a reception antenna. Note that, the configuration of the radar apparatus is not limited to the above configuration. For example, the radar apparatus is also adaptable to a pulse compression radar system in which a pulse train is phase modulated or amplitude modulated and is transmitted. Further, the radar apparatus may also be configured such that frequency-division multiplexed or code-division multiplexed different radar transmission signals are transmitted from a plurality of transmission antennas and each radar transmission signal is separated and reception processing is performed in a reception branch. Further, the radar apparatus is not limited to a MIMO radar system as long as the radar apparatus is configured to be capable of angle estimation as a wide-angle radar apparatus.

Further, either or both of the transmission antenna and the reception antenna may have a plurality of antennas, and the plurality of antennas may be arranged, for example, on a two-dimensional plane.

Note that, the embodiments described below are merely exemplary, and the present disclosure is not limited to the embodiments described below.

[Configuration of Radar Apparatus]

FIG. 1 is a block diagram illustrating a configuration example of a radar apparatus according to the present embodiment.

Radar apparatus 10 illustrated in FIG. 1 includes radar transmitter (transmission branch) 100, radar receiver (reception branch) 200, and reference-signal generator 300.

Further, radar receiver 200 illustrated in FIG. 1 includes, for example, target detector 215 (corresponding to, for example, an estimation circuit) that outputs detection results of a position, a relative velocity and a reflected wave intensity or the like of a target, and range side lobe processor 216 (corresponding to, for example, a processing circuit) that performs range side lobe-related processing (for example, determination processing or removal processing).

Figure 2:
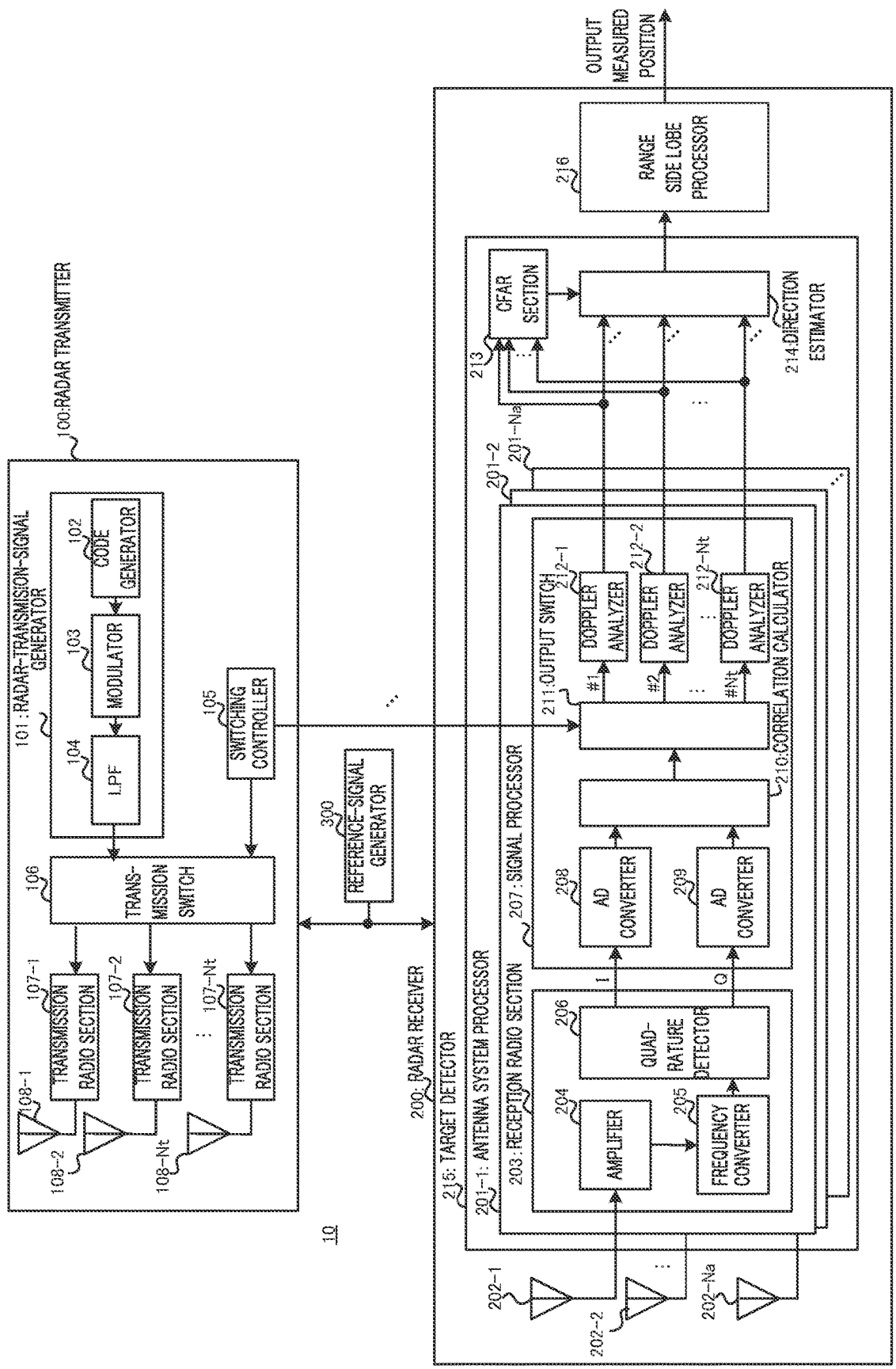
FIG. 2 is a block diagram illustrating a configuration example of the radar apparatus.

FIG. 2 is a block diagram illustrating a more detailed configuration example of radar apparatus 10 illustrated in FIG. 1.

Radar transmitter 100 generates radar signals (also referred to as "radar transmission signal") of a high frequency (radio frequency) based on a reference signal outputted from reference-signal generator 300. Then, radar transmitter 100 transmits the radar transmission signals in a predetermined transmission period by using a transmission antenna formed by a plurality of transmission antennas 108-1 to 108-Nt.

Radar receiver 200 receives reflected wave signals, which are radar transmission signals reflected by a target (not illustrated), by using a reception array antenna including a plurality of reception antennas 202-1 to 202-Na. Radar receiver 200 performs processing synchronized with radar transmitter 100 by performing the following processing operation using a reference signal outputted from reference-signal generator 300. Further, radar receiver 200 performs signal processing on the reflected wave signals received by each reception antenna 202 to perform detection of existence of the target or estimation of the directions of arrival of the reflected wave signals, for example.

Note that, the target is an object to be detected by radar apparatus 10. Examples of the target include vehicles (including four-wheeled and two-wheeled vehicles), persons, and blocks or curbstones, for example.

Reference-signal generator 300 is connected to each of radar transmitter 100 and radar receiver 200. Reference-signal generator 300 supplies the reference signal as a standard signal to radar transmitter 100 and radar receiver 200 to synchronize processing of radar transmitter 100 with processing of radar receiver 200.

[Configuration of Radar Transmitter 100]

Radar transmitter 100 includes radar-transmission-signal generator 101, switching controller 105, transmission switch 106, transmission radio sections 107-1 to 107-Nt, and transmission antennas 108-1 to 108-Nt. That is, radar transmitter 100 includes Nt pieces of transmission antennas 108, and each of transmission antennas 108 is connected to each individual transmission radio section 107.

Radar-transmission-signal generator 101 generates a timing clock obtained by multiplying the reference signal outputted from reference-signal generator 300 by a predetermined number and generates a radar transmission signal based on the generated timing clock. Then, radar-transmission-signal generator 101 outputs the radar transmission signal repeatedly in a predetermined radar transmission period (Tr). The radar transmission signals are expressed as $y(k, M)=I(k, M)+j\,Q(k, M)$, for example, where j is an imaginary unit, k is a discrete time, M is the ordinal number of the radar transmission period, and $I(k, M)$ and $Q(k, M)$ are the in-phase component and the quadrature component of a radar transmission signal $(k, M)$ at discrete time k in the M-th radar transmission period, respectively.

Radar-transmission-signal generator 101 includes code generator 102, modulator 103, and low pass filter (LPF) 104. Each of the constituent elements of radar-transmission-signal generator 101 is described below.

Code generator 102 generates code $a_n$ (M) (n=1 ..., L) (a pulse code) of a code sequence with code length L each radar transmission period Tr. An example of code $a_n$ (M) generated by code generator 102 is a code that provides low-range side lobe characteristics. Examples of the code sequence include Barker code, M-sequence code, and Gold code.

Modulator 103 performs pulse modulation (for example, amplitude modulation, amplitude shift keying (ASK), or pulse shift keying) or phase modulation (phase shift keying) on a pulse code sequence (for example, code $a_n$ (M)) outputted from code generator 102 and outputs the modulated signal to LPF 104.

LPF 104 outputs a signal component in a predetermined limited band or lower, of the modulated signals outputted from modulator 103, to transmission switch 106 as a radar transmission signal in a baseband.

Figure 3:
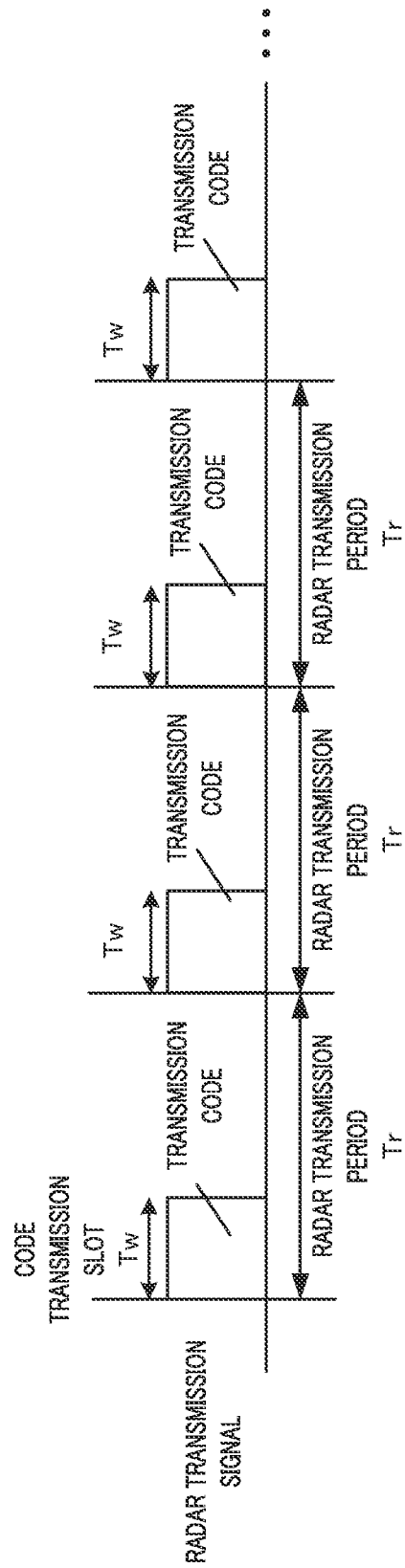
FIG. 3 illustrates an example of a radar transmission signal.

FIG. 3 illustrates an example of a radar transmission signal generated by radar-transmission-signal generator 101. As illustrated in FIG. 3, a pulse code sequence of code length L is included in code transmission slot Tw in radar transmission period Tr. The pulse code sequence is transmitted in code transmission slot Tw in each radar transmission period Tr, and the remaining slot (Tr−Tw) is a no-signal slot. A single code includes L pieces of sub-pulses. In addition, pulse modulation using No pieces of samples is performed on each of the sub-pulses and, thus, Nr (=No×L) pieces of sample signals are included in each code transmission slot Tw. Furthermore, Nu pieces of samples are included in the no-signal slot (Tr−Tw) in radar transmission period Tr.

In FIG. 2, switching controller 105 controls transmission switch 106 in radar transmitter 100 and output switch 211 in radar receiver 200. Note that, the control operation on output switch 211 of radar receiver 200 by switching controller 105 will be described below in the description of the operation of radar receiver 200. The control operation on transmission switch 106 of radar transmitter 100 by switching controller 105 will be described below.

For example, switching controller 105 outputs, to transmission switch 106, a control signal (hereinafter referred to as "switching control signal") to switch between transmission antennas 108 (in other words, transmission radio sections 107) in each radar transmission period Tr.

Transmission switch 106 performs a switching operation of outputting the radar transmission signal outputted from radar-transmission-signal generator 101 to transmission radio section 107 indicated by the switching control signal outputted from switching controller 105. For example, transmission switch 106 selects and switches one of a plurality of transmission radio sections 107-1 to 107-Nt based on the switching control signal and outputs the radar transmission signal to the selected transmission radio section 107.

Z-th (z=1, ..., Nt) transmission radio section 107 performs frequency conversion on a radar transmission signal in a baseband outputted from transmission switch 106 to generate a radar transmission signal in a carrier frequency (radio frequency (RF)) band and amplifies the signal to predetermined transmission power P [dB] with a transmission amplifier, and outputs the signal to z-th transmission antenna 108.

Z-th (z=1, ..., Nt) transmission antenna 108 radiates the radar transmission signal outputted from z-th transmission radio section 107 into the air.

Figure 4:
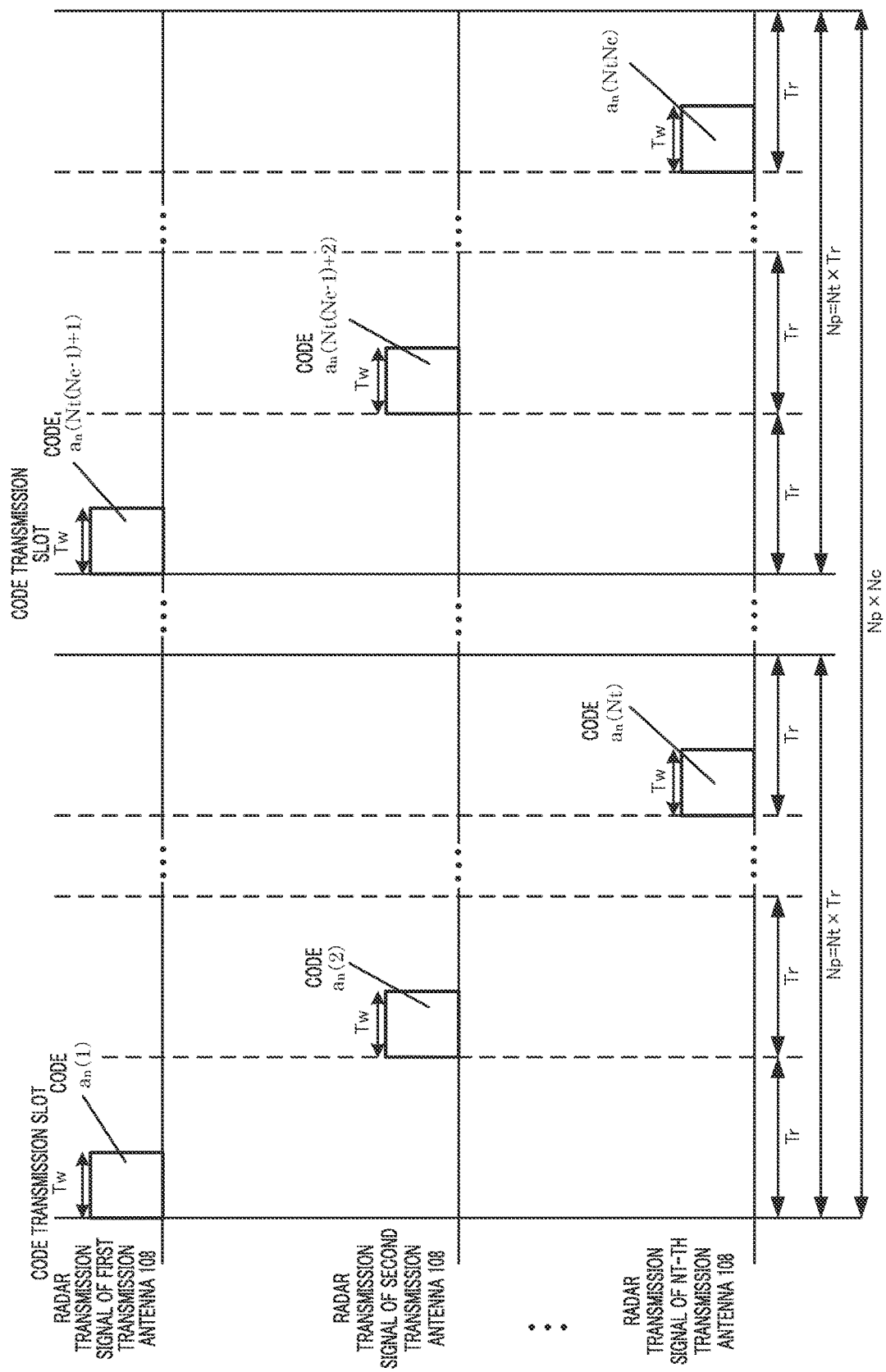
FIG. 4 illustrates an example of switching control of transmission antennas.

FIG. 4 illustrates an example of switching operation of transmission antennas 108 according to the present embodiment. Note that, the switching operation of transmission antennas 108 according to the present embodiment is not limited to the example illustrated in FIG. 4.

In FIG. 4, switching controller 105 outputs, to transmission switch 106, a switching control signal representing an instruction to sequentially switch through transmission antennas from first transmission antenna 108 (or transmission radio section 107-1) to Nt-th transmission antenna 108 (or transmission radio section 107-Nt) in each radar transmission period Tr. Thus, in each of first transmission antenna 108 to Nt-th transmission antenna 108, the radar transmission signal is transmitted in a transmission interval of Np (=Nt×Tr) period.

Switching controller 105 performs control such that the switching operation of transmission radio section 107 in antenna switching period Np is repeated Nc times.

Note that, the transmission signal transmission start time in each transmission radio section 107 may not be synchronized with period Tr. For example, each transmission radio section 107 may start transmission of the radar transmission signal at the transmission start time with different transmission delays $\Delta_1, \Delta_2, \ldots, \Delta Nt$. In a case where such transmission delays $\Delta_1, \Delta_2, \ldots, \Delta Nt$ are provided, a transmission-phase correction coefficient that takes transmission delays $\Delta_1, \Delta_2, \ldots, \Delta Nt$ into account in processing of radar receiver 200 to be described later may be introduced. Thus, it is possible to suppress the influence of different phase rotations due to Doppler frequency in a reception signal. Varying such transmission delays $\Delta_1, \Delta_2, \ldots, \Delta Nt$ every measurement provides the effect of mutually randomizing the influence of interference from another radar apparatus (not illustrated) in a case where there is interference from the other radar apparatus or in a case where the radar apparatus interferes with the other radar apparatus.

Figure 5:
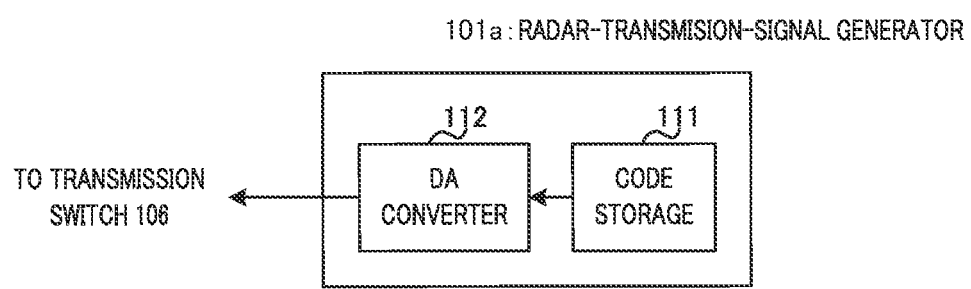
FIG. 5 is a block diagram illustrating a configuration example of a radar-transmission-signal generator.

Further, radar transmitter 100 may include radar-transmission-signal generator 101a illustrated in FIG. 5 instead of radar-transmission-signal generator 101. Radar-transmission-signal generator 101a does not include code generator 102, modulator 103, and LPF 104 illustrated in FIG. 2, but includes code storage 11 and DA converter 112 instead. Code storage 111 stores in advance the code sequence generated in code generator 102 (FIG. 2), and reads out the stored code sequence cyclically in sequence. DA converter 112 converts the code sequence (digital signals) outputted from code storage 111 to analog signals (baseband signals).

[Configuration of Radar Receiver 200]

In FIG. 2, radar receiver 200 includes Na pieces of reception antennas 202 which form an array antenna. In radar receiver 200, target detector 215 includes Na pieces of antenna system processors 201-1 to 201-Na, constant false alarm rate (CFAR) section 213, and direction estimator 214.

For example, target detector 215 outputs, after signal processing on a reception signal including a reflected wave signal from a target, information (referred to as "target information" or "point cloud data", for example) indicating detection results of a position, a relative velocity, a reflected wave intensity or the like of the target to range side lobe processor 216.

Based on the information outputted from target detector 215, range side lobe processor 216 determines, among a detected point cloud with respect to a target, a detection point that may be a range side lobe with respect to the target, and sets a flag (also referred to as "range side lobe flag", for example) to the detection point determined as the range side lobe, for example. Range side lobe processor 216 may remove information on the detection point determined as the range side lobe from the target information and output the target information after removal, for example. Alternatively, range side lobe processor 216 may output target information including flags indicating whether each detection point of the detected point cloud with respect to the target is determined as the range side lobe.

Note that, the target information outputted from range side lobe processor 216 may be outputted to, for example, a software processor (for example, a processor that performs clustering, tracking, object identification, or the like; not illustrated) at a subsequent stage of radar receiver 200.

In FIG. 2, each reception antenna 202 receives a reflected wave signal, which is a radar transmission signal reflected by a target, and outputs the received reflected wave signal (also referred to as "reception signal") to corresponding antenna system processor 201.

Each antenna system processor 201 includes reception radio section 203 and signal processor 207.

Reception radio section 203 includes amplifier 204, frequency converter 205, and quadrature detector 206. Reception radio section 203 generates a timing clock obtained by multiplying the reference signal outputted from reference-signal generator 300 by a predetermined number and operates on the basis of the generated timing clock. Specifically, amplifier 204 amplifies the reception signal outputted from reception antenna 202 to a predetermined level. Frequency converter 205 converts the frequency of the reception signal in a high frequency band to a baseband frequency. Quadrature detector 206 converts the reception signal in the baseband to a reception signal in a baseband, including an I signal and a Q signal, by quadrature detection.

Signal processor 207 of each antenna system processor 201-z (where z is any one of 1 to Na) includes AD converters 208 and 209, correlation calculator 210, output switch 211, and Doppler analyzers 212-1 to 212-Nt (hereinafter, may also be referred to simply as "Doppler analyzer 212").

AD converter 208 receives the I signal from quadrature detector 206, while AD converter 209 receives the Q signal from quadrature detector 206. AD converter 208 performs sampling on the baseband signal including the I signal at a discrete time so as to convert the I signal into digital data. AD converter 209 performs sampling on the baseband signal including the Q signal at a discrete time so as to convert the Q signal into digital data.

Note that, in the sampling performed by AD converters 208 and 209, Ns pieces of discrete sampling operations, for example, are performed per sub-pulse time Tp (=Tw/L) of a radar transmission signal. That is, the number of over-samples per sub-pulse is Ns.

In the following description, by using I signal $I_z(k, M)$ and Q signal $Q_z(k, M)$ (where z is any one of 1 to Na), the baseband reception signals at discrete time k in M-th radar transmission period Tr[M], which are the outputs from AD converters 208 and 209, are expressed as a complex number signal $x_z(k, M) = I_z(k, M) + j Q_z(k, M)$. In addition, in the following description, discrete time k is based on timing at which radar transmission period (Tr) starts (k=1), and signal processor 207 periodically operates up to k=(Nr+Nu)Ns/No that is a sample point up to the end of radar transmission period Tr. That is, k=1, ..., (Nr+Nu)Ns/No. Note that, j is an imaginary unit.

Correlation calculator 210 of z-th (where z=1, ..., Na) signal processor 207 performs correlation calculation between discrete sample value $x_z(k, M)$ including discrete sample values $I_z(k, M)$ and $Q(k, M)$ received from AD converters 208 and 209 and pulse code $a_n(M)$ of code length L (where z=1, ..., Na, and n=1, ..., L) transmitted from radar transmitter 100 in each radar transmission period Tr. For example, correlation calculator 210 performs sliding correlation calculation between discrete sample value $x_z(k, M)$ and pulse code $a_n(M)$. For example, correlation calculation value $AC_z(k, M)$ obtained through the sliding correlation calculation at discrete time k in M-th radar transmission period Tr[M] is calculated based on the following equation:

(Equation 1)

$$AC_z(k, M) = \sum_{n=1}^{L} x_z(k + N_s(n-1), M) a_n(M)^* \quad [1]$$

In equation 1, asterisk (*) denotes a complex conjugate operator.

Correlation calculator 210 performs correlation calculation over the duration of k=1, ..., (Nr+Nu)Ns/No according to equation 1, for example.

Figure 6:
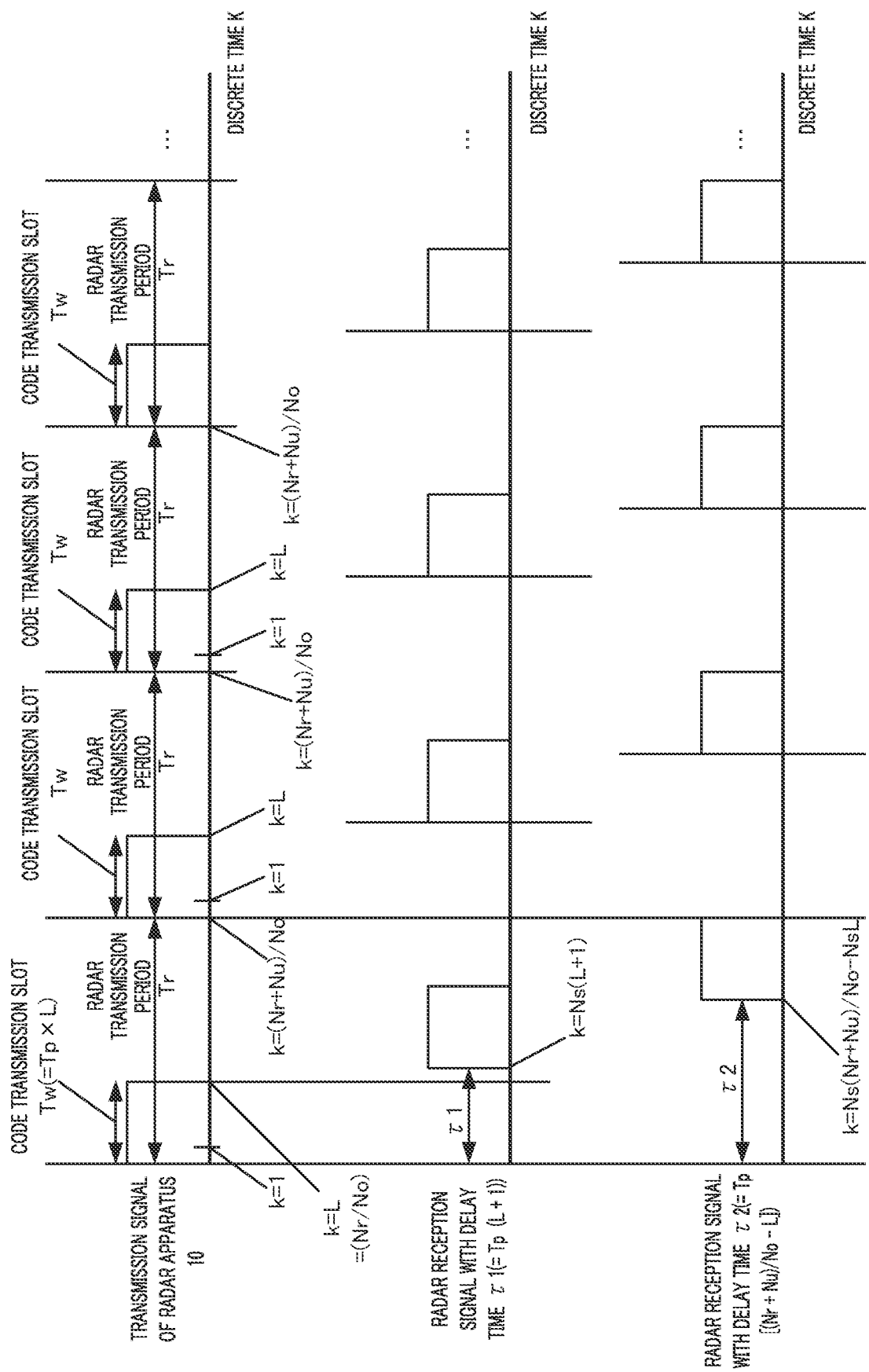
FIG. 6 illustrates an example of transmission timing and a measurement range of the radar transmission signal.

Note that, correlation calculator 210 may perform the correlation calculation not only on k=1, ..., (Nr+Nu)Ns/No but on a limited measurement range (the measurement range is the range of k) according to the existing range of the target to be measured by radar apparatus 10. This allows radar apparatus 10 to reduce the calculation processing amount of correlation calculator 210. For example, correlation calculator 210 may limit the measurement range to k=Ns(L+1), ..., (Nr+Nu)Ns/No–NsL. In this case, radar apparatus 10 does not perform measurement in the time slot corresponding to code transmission slot $T_w$ as illustrated in FIG. 6.

Thus, in radar apparatus 10, even in a case where a radar transmission signal goes directly into radar receiver 200, correlation calculator 210 does not perform processing in a duration (at least a duration less than τ1) in which the radar transmission signal goes into radar receiver 200, which allows a measurement in which the influence of the radar transmission signal going into radar receiver 200 is removed. Further, in a case where the measurement range (the range of k) is limited, processing in which the measurement range (the range of k) is limited may also be applied to processing of output switch 211, Doppler analyzer 212, CFAR section 213, and direction estimator 214 that are described later. Thereby, the processing amount of each constituent element can be reduced, and the power consumption of radar receiver 200 can be decreased.

In FIG. 2, based on the switching control signal inputted from switching controller 105, output switch 211 selectively switches to one of Nt pieces of Doppler analyzers 212 and outputs the output of correlation calculator 210 in each radar transmission period Tr to selected Doppler analyzer 212. Hereinafter, as an example, a switching control signal in M-th radar transmission period Tr[M] is represented by Nt-bit information [bit1(M), bit2(M), ..., bitNt(M)]. For example, in a case where an ND-th bit (where ND is any one of 1 to Nt) of the switching control signal in M-th radar transmission period Tr[M] is '1', output switch 211 selects ND-th Doppler analyzer 212 (in other words, switches on Doppler analyzer 212). In contrast, in a case where the ND-th bit of the switching control signal in M-th radar transmission period Tr[M] is '0', output switch 211 does not select ND-th Doppler analyzer 212 (in other words, switches off Doppler analyzer 212). Output switch 211 outputs, to selected Doppler analyzer 212, correlation calculation value $AC_z(k, M)$ that is inputted from correlation calculator 210.

For example, the Nt-bit switching control signals corresponding to the switching operation of transmission radio sections 107 (or transmission antennas 108) illustrated in FIG. 4 are indicated below.

$$[bit1(1), bit2(1), \ldots, bitNt(1)] = [1, 0, \ldots, 0]$$

$$[bit1(2), bit2(2), \ldots, bitNt(2)] = [0, 1, \ldots, 0]$$

$$\ldots$$

$$[bit1(Nt), bit2(Nt), \ldots, nitNt(Nt)] = [0, 0, \ldots, 1]$$

As described above, each Doppler analyzer 212 is sequentially selected (in other words, turned on) in a period of Np(=Nt×Tr). For example, the switching control signal repeats the above content Nc times.

Z-th (z=1, . . . , Na) signal processor 207 includes Nt pieces of Doppler analyzers 212.

Doppler analyzer 212 performs Doppler analysis on the output from output switch 211 (for example, correlation calculation value $AC_z(k, M)$) at each discrete time k. For example, in a case where Nc is a power of 2, fast Fourier transform (FFT) processing can be applied to the Doppler analysis.

The w-th output of ND-th Doppler analyzer 212 of z-th signal processor 207 exhibits Doppler frequency response $FT\_CI_z^{(ND)}(k, f_s, w)$ of Doppler frequency index fs at discrete time k, as expressed in the following equation, where ND=1 to Nt, k=1, . . . , (Nr+Nu)Ns/No, w is an integer equal to or greater than 1, j is an imaginary unit, and z=1 to Na.

(Equation 2)

$$FT\_CI_z^{(ND)}(k, f_s, w) = \sum_{q=0}^{N_t N_c - 1} bit_{ND}(q+1) AC_z(k, N_t N_c(w-1) + q + 1) \exp\left[-j\frac{2\pi \left\lfloor \frac{q}{N_t} \right\rfloor f_s}{N_c}\right] \quad [2]$$

Note that, in the FFT processing, Doppler analyzer 212 may perform multiplication by a window function coefficient, such as Han window or Hamming window. The use of the window function coefficient makes it possible to suppress side lobes generated around a peak.

The processing of each constituent element of signal processor 207 has been described thus far.

In FIG. 2, CFAR section 213 uses the output from Doppler analyzer 212 to perform CFAR processing (in other words, adaptive threshold determination), extracts index k_cfar at a discrete time, which gives a peak signal, and index fs_cfar of Doppler frequency, and outputs the indices to direction estimator 214.

Note that, radar apparatus 10 may also perform direction estimation processing with direction estimator 214 without performing the CFAR processing.

In FIG. 2, direction estimator 214 performs target direction estimation processing by using the outputs from each Doppler analyzer 212 based on information (for example, time index k_cfar and Doppler frequency index fs_cfar) outputted from CFAR section 213.

For example, direction estimator 214 generates virtual reception array correlation vector $h(k, f_s, w)$, as given by equation 3 to perform direction estimation processing.

Hereinafter, the w-th outputs from Doppler analyzers 212-1 to 212-Nt, which are obtained by similar processing performed by signal processors 207 in antenna system processors 201-1 to 201-Na, are expressed as virtual reception array correlation vector h(k, $f_s$, w) including Nt×Na pieces of elements, which is the product of number Nt of transmission antennas and number Na of reception antennas, as expressed by equation 3 (equation 4). Virtual reception array correlation vector h(k, $f_s$, w) is used for processing for direction estimation based on the phase difference between reception antennas 202 on the reflected wave signals from the target.

(Equation 3)

$$h(k, f_s, w) = \begin{bmatrix} FT\_CI_1^{(1)}(k, f_s, w)TxCAL^{(1)}(f_s) \\ FT\_CI_1^{(2)}(k, f_s, w)TxCAL^{(2)}(f_s) \\ \vdots \\ FT\_CI_1^{(N_t)}(k, f_s, w)TxCAL^{(N_t)}(f_s) \\ FT\_CI_2^{(1)}(k, f_s, w)TxCAL^{(1)}(f_s) \\ FT\_CI_2^{(2)}(k, f_s, w)TxCAL^{(2)}(f_s) \\ \vdots \\ FT\_CI_2^{(N_t)}(k, f_s, w)TxCAL^{(N_t)}(f_s) \\ \vdots \\ FT\_CI_{Na}^{(1)}(k, f_s, w)TxCAL^{(1)}(f_s) \\ FT\_CI_{Na}^{(2)}(k, f_s, w)TxCAL^{(2)}(f_s) \\ \vdots \\ FT\_CI_{Na}^{(N_t)}(k, f_s, w)TxCAL^{(N_t)}(f_s) \end{bmatrix} = \begin{bmatrix} h_1(k, f_s, w) \\ h_2(k, f_s, w) \\ \vdots \\ h_{Na}(k, f_s, w) \end{bmatrix} \quad [3]$$

(Equation 4)

$$h_z(k, fs, w) = \begin{bmatrix} FT\_CI_z^{(1)}(k, f_s, w)TxCAL^{(1)}(f_s) \\ FT\_CI_z^{(2)}(k, f_s, w)TxCAL^{(2)}(f_s) \\ \vdots \\ FT\_CI_z^{(2)}(k, f_s, w)TxCAL^{(3)}(f_s) \end{bmatrix} \quad [4]$$

where z=1, . . . , Na, and ND=, . . . , Nt.

Here, in a case where the CFAR processing is performed, virtual reception array correlation vector h(k, $f_s$, w) is h(k_cfar, fs_cfar, w) using the index of the peak signal extracted by the CFAR processing. Virtual reception array correlation vector h(k_cfar, fs_cfar, w) is a column vector formed of Na×Nt pieces of elements.

Further, in radar apparatus 10, transmission antennas 108 are switched using time division. This causes different phase rotations at different Doppler frequencies f. In equations 3 and 4, $TxCAL^{(1)}(f), \ldots, TxCAL^{(Nt)}(f)$ is a transmission-phase correction coefficient for correcting the phase rotations to match the phase of the reference transmission antenna.

For example, in a case where first transmission antenna 108 (ND=1) corresponding to the switching operation of transmission radio sections 107 (or transmission antennas 108) illustrated in FIG. 4 is the reference transmission antenna, the transmission-phase correction coefficient is given by the following equation.

(Equation 5)

$$TxCAL^{(1)}(f_s) = 1, \; TxCAL^{(2)}(f_s) = \exp\left(-j\frac{2\pi f}{Nc}\frac{1}{Nt}\right), \quad [5]$$

$$TxCAL^{(Nt)}(f_s) = \exp\left(-j\frac{2\pi f}{Nc}\frac{Nt-1}{Nt}\right)$$

Note that, in a case where the transmission signal transmission start times of transmission radio sections 107 are given different transmission delays $\Delta_1, \Delta_2, \ldots, \Delta_{Nt}$, transmission-phase correction coefficient $TxCAL^{(ND)}(f)$ expressed by equation 5 may be multiplied by correction coefficient $\Delta_{TxCAL}^{(ND)}(f)$ of equation 6 to obtain new transmission-phase correction coefficient $TxCAL^{(ND)}(f)$. In a reception signal, this makes it possible to suppress the influence of phase rotations that vary depending on Doppler frequencies.

(Equation 6)

$$\Delta_{TxCAL}^{(ND)}(f)\exp\left(-j\frac{2\pi f}{Nc}\frac{\Delta_{ND}-\Delta_{ref}}{N_p}\right) \quad [6]$$

where ND in $\Delta_{TxCAL}^{(ND)}(f)$ is a reference transmission antenna number used as phase reference.

In FIG. 2, direction estimator 214 calculates virtual reception array correlation vector $h\_{after\_cal}(k, f_s, w)$ in which the deviation between antennas is corrected by multiplying virtual reception array correlation vector $h(k, f_s, w)$ of w-th Doppler analyzer 212 outputted from first signal processor 207 to Na-th signal processor 207 by array correction value $h_{cal[b]}$ for correcting the phase shift deviation and the amplitude deviation between the transmission antennas and between the reception array antennas. Virtual reception array correlation vector $h\_{after\_cal}(k, f_s, w)$ is given by equation 7.

(Equation 7)

$$h\_{after\_cal}(k, fs, w) = CA\, h(k, fs, w) = \begin{bmatrix} h_1(k, fs, w) \\ h_2(k, fs, w) \\ \vdots \\ h_{Na \times Nr}(k, fs, w) \end{bmatrix} \quad [7]$$

$$CA = \begin{bmatrix} h\_cal_{[1]} & 0 & \cdots & 0 \\ 0 & h\_cal_{[2]} & \cdots & 0 \\ \vdots & \ddots & \ddots & \vdots \\ 0 & \cdots & 0 & h\_cal_{[Nt \times Na]} \end{bmatrix}$$

where b=1, ..., (Nt×Na).

Virtual reception array correlation vector $h\_{after\_cal}(k, f_s, w)$ in which the deviation between the antennas is corrected is a column vector formed of Na×Nt pieces of elements. Hereinafter, the elements of virtual reception array correlation vector $h\_{after\_cal}(k, f_s, w)$ are expressed as $h_1(k, w)$, ..., Nt(k, $f_s$, w) and are used for describing direction estimation processing.

Direction estimator 214 performs direction estimation processing based on the phase difference between the reflected wave signals of reception antennas 202 by using virtual reception array correlation vector $h\_{after\_cal}(k, f_s, w)$.

For example, direction estimator 214 calculates a spatial profile, with azimuth direction θ in direction estimation evaluation function value $P_H(\theta, k, f_s, w)$ being variable in a predetermined angular range, extracts a predetermined number of maximum peaks of the calculated spatial profile in descending order, and takes the azimuth direction of the maximum peaks as direction-of-arrival estimate values.

Note that, evaluation function value $P_H(\theta, k, f_s, w)$ depends on the direction-of-arrival estimation algorithm. For example, an estimation method using an array antenna disclosed in NPL 3 may be used. For example, a beamformer method can be expressed as equations 8 and 9. Other applicable methods include Capon and MUSIC methods.

(Equation 8)

$$P_H(\theta_u, k, fs, w) = |a_H(\theta_u)^H h\_{after\_cal}(k, fs, w)|^2 \quad [8]$$

(Equation 9)

$$a_H(\theta_u) = \begin{bmatrix} 1 \\ \exp\{-j2\pi d_H \sin\theta_u / \lambda\} \\ \vdots \\ \exp\{-j2\pi(N_{VAH}-1)d_H \sin\theta_u / \lambda\} \end{bmatrix} \quad [9]$$

Where superscript H is an Hermitian transpose operator, $a_H(\theta_u)$ represents the directional vector of the virtual reception array with respect to incoming waves in azimuth direction $\theta_u$. $\theta_u$ is the azimuth range of direction-of-arrival estimation varied for a predetermined azimuth interval $\beta_1$. For example, $\theta_u$ is set as follows:

$$\theta_u = \theta_{min} + u\beta_1, u=0, \ldots, NU$$

$$NU = \text{floor}[(\theta_{max} - \theta_{min})/\beta_1] + 1$$

where floor(x) is a function that returns a maximum integer value that does not exceed real number x.

A case where the processing of direction estimator 214 described above is adapted to the three-dimensional coordinate system illustrated in FIG. 7 and two-dimensional direction estimation processing is performed will be described.

Figure 7:
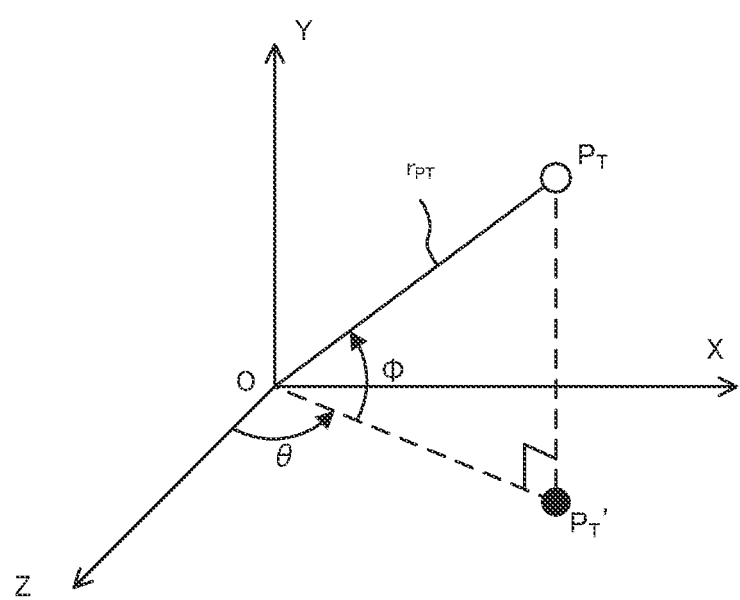
FIG. 7 illustrates a three-dimensional coordinate system used for describing an operation of a direction estimator.

In FIG. 7, the position vector of target $P_T$ with respect to origin O is defined as $r_{PT}$. Further, in FIG. 7, $P_T'$ is the projective point of position vector $r_{PT}$ of target $P_T$ projected to an X-Z plane. In this case, azimuth angle θ is defined as the angle formed by line O–$P_T'$ and the Z-axis (in a case where the X-coordinate of target $P_T$ is positive, θ>0). Further, elevation angle φ is defined as the angle of a line connecting target $P_T$, origin O, and projective point $P_T'$ in a plane including target $P_T$, origin O, and projective point $P_T'$ (in a case where the Y-coordinate of target $P_T$ is positive, φ>0). Note that, hereinafter, a description will be given with an example in which transmission antennas 108 and reception antennas 202 are arranged in an X-Y plane.

The position vector of the $n_{va}$-th antenna element in the virtual reception array with respect to origin O is expressed as $Sn_{vn}$, where $n_{va}$=1, ..., Nt×Na.

Further, position vector $S_1$ of the first ($n_{va}$=1) antenna element in the virtual reception array is determined on the basis of the positional relationship between the physical position of first reception antenna 202 and origin O. Position vectors $S_2$, ..., $Sn_{va}$ of the other antenna elements in the virtual reception array are determined with respect to position vector $S_1$ of the first antenna element in a state in which the relative arrangement of the virtual reception array determined from the element interval of transmission antennas 108 and reception antennas 202 present in the X-Y plane is maintained. Note that, origin O may be aligned with the physical position of first reception antenna 202.

In a case where radar receiver 200 receives reflected waves from target $P_T$ present in a far field, phase difference $d(r_{PT}, 2, 1)$ of the reception signal at the second antenna element with respect to the reception signal at the first antenna element in the virtual reception array is expressed by equation 10.

(Equation 10)

$$d(r_{PT}, 2, 1) = -\frac{2\pi}{\lambda}\frac{\langle -r_{PT}, (S_2 - S_1)\rangle}{|r_{PT}|} = \frac{2\pi}{\lambda}\left\langle \frac{r_{PT}}{|r_{PT}|}, (S_2 - S_1)\right\rangle = \frac{2\pi}{\lambda}\left\langle \frac{r_{PT}}{|r_{PT}|}, D(2,1)\right\rangle \quad [10]$$

where <x, y> is the inner product operator of vector x and vector y.

Note that, the position vector of the second antenna element with respect to the position vector of the first antenna element in the virtual reception array is expressed as inter-element vector D(2, 1) in equation 11.

(Equation 11)

$$D(2, 1) = S_2 - S_1 \quad [11]$$

In the same manner, in a case where radar receiver 200 receives reflected waves from target $P_T$ present in a far field, the phase difference $d(r_{PT}, n_{va}^{(t)}, n_{va}^{(r)})$ of the reception signal of the $n_{va}^{(t)}$-th antenna element with respect to the reception signal of the nva$^{(r)}$-th antenna element in the virtual reception array is expressed by equation 12.

(Equation 12)

$$d\left(r_{PT}, n_{va}^{(t)}, n_{va}^{(r)}\right) = \frac{2\pi}{\lambda}\left\langle \frac{r_{PT}}{|r_{PT}|}, D\left(n_{va}^{(t)}, n_{va}^{(r)}\right)\right\rangle \quad [12]$$

where $n_{va}^{(r)}=1, \ldots, Nt \times Na$, $n_{va}^{(t)}=1, \ldots, Nt \times Na$.

Note that, the position vector of the $n_{va}^{(t)}$-th antenna element with respect to the position vector of the $n_{va}^{(t)}$-th antenna element in the virtual reception array is expressed as inter-element vector $D(n_{va}^{(t)}, nva(t))$ in equation 13.

(Equation 13)

$$D\left(n_{va}^{(t)}, n_{va}^{(r)}\right) = S_{n_{va}^{(t)}} - S_{n_{va}^{(r)}} \quad [13]$$

As expressed by equations 12 and 13, the phase difference $d(r^{PT}, n_{va}^{(t)}, nva^{(r)})$ of the reception signal of the $n_{va}^{(t)}$-th antenna element with respect to the reception signal of the nva$^{(r)}$-th antenna element in the virtual reception array depends on the unit vector $(r_{PT}/|r_{PT}|)$ indicating the direction to target $P_T$ present in a far field and inter-element vector $D(n_{va}^{(t)}, nva^{(t)})$.

Further, in a case where the virtual reception array is present in the same plane, inter-element vector $D(n_{va}^{(t)}, n_{va}^{(r)})$ is present in the same plane. Direction estimator 214 assumes that antenna elements are virtually present at positions indicated by the inter-element vector to form a virtual plane array antenna by using all or some of such inter-element vectors and performs two-dimensional direction estimation processing. That is, direction estimator 214 performs direction-of-arrival estimation processing by using a plurality of virtual antenna elements interpolated by means of interpolation processing on the antenna elements forming the virtual reception array.

Note that, in a case where the virtual antenna elements overlap, direction estimator 214 may select one of the overlapping antenna elements in advance in a fixed manner. Alternatively, direction estimator 214 may perform averaging processing by using the reception signals of all of the overlapping virtual antenna elements.

Hereinafter, a description will be given of two-dimensional direction estimation processing using a beamformer method in a case where a virtual plane array antenna is formed by using a cloud of $N_q$ pieces of inter-element vectors.

Here, the nq-th inter-element vector forming the virtual plane array antenna will be expressed as $D(n_{va(nq)}^{(t)}, n_{va(nq)}^{(r)})$, where nq=1, . . . , $N_q$.

For example, direction estimator 214 generates virtual plane arrangement array antenna correlation vector $h_{VA}(k, f_s, w)$ expressed in equation 14 by using $h_1(k, f_s, w), \ldots, h_{Na}$ N(k, $f_s$, w) which are the elements of virtual reception array correlation vector $h\_{after\_cal}(k, f_s, w)$.

(Equation 14)

$$h_{VA}(k, fs, w) = CA\, h(k, fs, w) = \begin{bmatrix} h_{n_{va(1)}^{(t)}}(k, fs, w) h^*_{n_{va(1)}^{(r)}}(k, fs, w)/|h^*_{n_{va(1)}^{(r)}}(k, fs, w)| \\ h_{n_{va(2)}^{(t)}}(k, fs, w) h^*_{n_{va(2)}^{(r)}}(k, fs, w)/|h^*_{n_{va(2)}^{(r)}}(k, fs, w)| \\ \vdots \\ h_{n_{va(N_q)}^{(t)}}(k, fs, w) h^*_{n_{va(N_q)}^{(r)}}(k, fs, w)/|h^*_{n_{va(N_q)}^{(r)}}(k, fs, w)| \end{bmatrix} \quad [14]$$

Virtual plane array directional vector $a_{VA}(\theta_u, \varphi_V)$ is expressed by equation 15.

(Equation 15)

$$a_{VA}(\theta_u, \Phi_v) = \begin{bmatrix} \exp\left\{j\frac{2\pi}{\lambda}\left\langle \frac{r_{PT}(\theta_u, \Phi_v)}{|r_{PT}(\theta_u, \Phi_v)|}, D\left(n_{va(1)}^{(t)}, n_{va(1)}^{(r)}\right)\right\rangle\right\} \\ \exp\left\{j\frac{2\pi}{\lambda}\left\langle \frac{r_{PT}(\theta_u, \Phi_v)}{|r_{PT}(\theta_u, \Phi_v)|}, D\left(n_{va(2)}^{(t)}, n_{va(2)}^{(r)}\right)\right\rangle\right\} \\ \vdots \\ \exp\left\{j\frac{2\pi}{\lambda}\left\langle \frac{r_{PT}(\theta_u, \Phi_v)}{|r_{PT}(\theta_u, \Phi_v)|}, D\left(n_{va(N_q)}^{(t)}, n_{va(N_q)}^{(r)}\right)\right\rangle\right\} \end{bmatrix} \quad [15]$$

In a case where the virtual reception array is present in the X-Y plane, the relationship among unit vector $(r_{PT}/|r_{PT}|)$ indicating the direction to target $P_T$, azimuth angle θ, and elevation angle φ is expressed by equation 16.

(Equation 16)

$$\frac{r_{PT}(\theta_u, \Phi_v)}{|r_{PT}(\theta_u, \Phi_v)|} = \begin{pmatrix} \sin\theta_u \cos\Phi_v \\ \sin\Phi_v \\ \cos\theta_u \cos\Phi_v \end{pmatrix} \quad [16]$$

Direction estimator 214 calculates unit vector $(r_{PT}/|r_{PT}|)$ by using equation 16 for each of angular directions $\theta_u$ and φv for calculating a vertical and horizontal two-dimensional spatial profile.

Further, direction estimator 214 performs two-dimensional direction estimation processing in the horizontal direction and the vertical direction by using virtual plane arrangement array antenna correlation vector $h_{VA}(k, f_s, w)$ and virtual plane array directional vector $a_{VA}(\theta_u, φv)$.

In the two-dimensional direction estimation processing using the beamformer method, direction estimator 214 calculates a vertical and horizontal two-dimensional spatial profile by using the two-dimensional direction estimation evaluation function expressed by equation 17 by using virtual plane arrangement array antenna correlation vector $h_{VA}(k, f_s, w)$ and virtual plane array directional vector $a_{VA}(\theta_u, \varphi v)$. Direction estimator 214 takes the azimuth angle and elevation angle directions, which are the maximum value or maximal value of the calculated two-dimensional spatial profile, as direction-of-arrival estimate values.

(Equation 17)

$$P_{VA}(\theta_u, \Phi_v, k, fs, w) = |a_{VA}(\theta_u, \Phi_v)^H h_{VA}(k, fs, w)|^2 \qquad [17]$$

Note that, in addition to the beamformer method, direction estimator 214 may apply a high-resolution direction-of-arrival estimation algorithm, such as a Capon method or a MUSIC method, by using virtual plane arrangement array antenna correlation vector $h_{VA}(k, f_s, w)$ and virtual plane array directional vector $a_{VA}(\theta_u, \varphi v)$. This increases the amount of calculation but can improve the angular resolution.

Further, a case where direction estimator 214 performs two-dimensional direction estimation processing has been described as illustrated in the three-dimensional coordinate system of FIG. 7. However, direction estimator 214 not necessarily performs two-dimensional direction estimation processing, but is also adaptable to a case of performing one-dimensional direction estimation processing corresponding to a two-dimensional coordinate system.

Further, the direction estimation processing of an MIMO radar that uses a plurality of antennas of radar transmitter 100 and radar receiver 200 has been described here, but the direction estimation processing of an MIMO radar is also adaptable to a case where one of radar transmitter 100 and radar receiver 200 includes a plurality of antennas.

The operation of direction estimator 214 has been described thus far.

Note that, time information k described above may be converted to distance information and outputted. Equation 18 may be used when converting time information k to distance information R(k).

(Equation 18)

$$R(k) = k \frac{T_w C_0}{21}. \qquad [18]$$

where $T_w$ is code transmission slot. L is pulse code length, and $C_0$ is light speed.

Further, Doppler frequency information may be converted to a relative velocity component and outputted. Equation 19 may be used when converting Doppler frequency $f_s\Delta\varphi$ to relative velocity component $vd(f_s)$.

(Equation 19)

$$v_d(f_s) = \frac{\lambda}{2} f_s \Delta\Phi \qquad [19]$$

where $\lambda$ is the wavelength of the carrier frequency of an RF signal.

[Example of Range Side Lobe Processing in Radar Apparatus 10]

An operation example of range side lobe processor 216 of radar apparatus 10 having the configuration described above will be described.

As an example described below, range side lobe processor 216 determines, based on target data (also referred to as $P_{nt}$ (nt=1 to N) data of a point cloud of N pieces of points (hereinafter, also referred to as "pre-target point cloud") of a reflected wave) outputted from target detector 215, a pre-target point, which may be a range side lobe, among the pre-target point cloud. In other words, range side lobe processor 216 determines whether each pre-target point of a pre-target point cloud is a range side lobe component.

Note that, of target information (also referred to as "point cloud data") inputted from target detector 215, point data of the nt-th (nt=1 to N) pre-target point includes, for example, information on an estimated position (for example, distance $R_{nt}$, azimuth angle $\theta_{nt}$, and elevation angle $\varphi_{nt}$), an estimated relative velocity $v_{nt}$, and an estimated power $Pw_{nt}$ of the pre-target point. Distance $R_{nt}$ corresponds, for example, to distance information (or time information k) expressed by equation 18. Azimuth angle $\theta$ and elevation angle $\varphi_{nt}$ correspond, for example, to direction-of-arrival estimate values obtained by direction estimator 214. Relative velocity vu corresponds, for example, to a relative velocity component vu expressed by equation 19. Power $Pw_{nt}$ is calculated from, for example, virtual reception array correlation vector h(k, f, w) or virtual plane arrangement array antenna correlation vector $h_{VA}(k, f_s, w)$.

Figure 8:
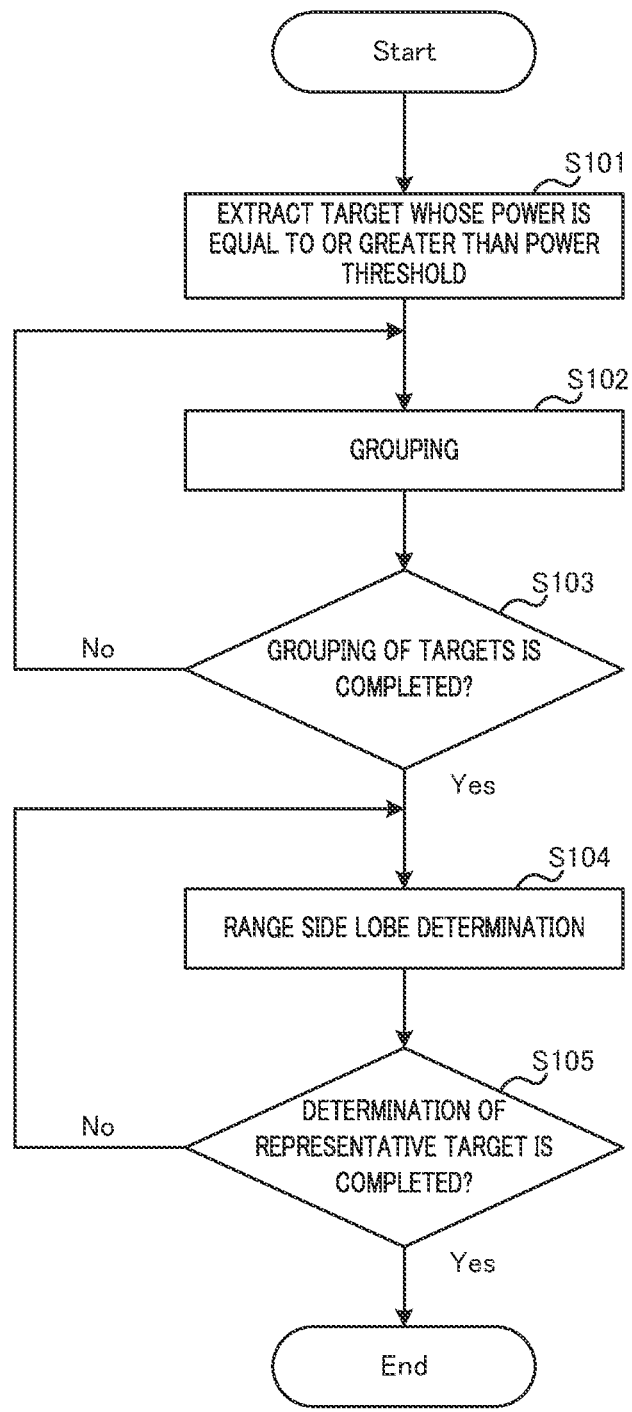
FIG. 8 is a flowchart illustrating an operation example of a range side lobe processor.

FIG. 8 is a flowchart illustrating an operation example of range side lobe processor 216.

For example, range side lobe processor 216 may start the operation indicated in FIG. 8 after target information is outputted from target detector 215 (for example, see FIG. 1 or 2) (in other words, after target estimation processing).

<Search for Pre-Target Point>

In FIG. 8, range side lobe processor 216 extracts (in other words, searches for) a pre-target point, whose power $Pw_{nt}$ (nt=1 to N) is equal to or greater than threshold power $P_{Wth}$ (in other words, $Pw_{nt} \geq Pw_{th}$), from a pre-target point cloud of N pieces of pre-targets (S101).

Here, threshold power $Pw_{th}$ may be set to be, for example, approximately the same as or less than a level obtained by adding a computationally ideal range side lobe level to the sum of all noise floor levels of the virtual reception array. As threshold power Pwth is smaller, the number of pre-target points whose power $Pw_{nt}$ is equal to or greater than threshold power Pwth is likely to increase, and the number of pre-target points to be determined by range side lobe processor 216 whether the pre-target points are range side lobes increases.

A pre-target point which is obviously at a range side lobe level can be eliminated by setting threshold power Pwth to a level obtained by adding a computationally ideal range side lobe level to the sum of all noise floor levels of the virtual reception array.

<Grouping of Pre-Target Points>

Range side lobe processor 216 performs grouping of pre-target points whose power $Pw_{nt}$ is equal to or greater than a threshold (S102).

Figure 10A:
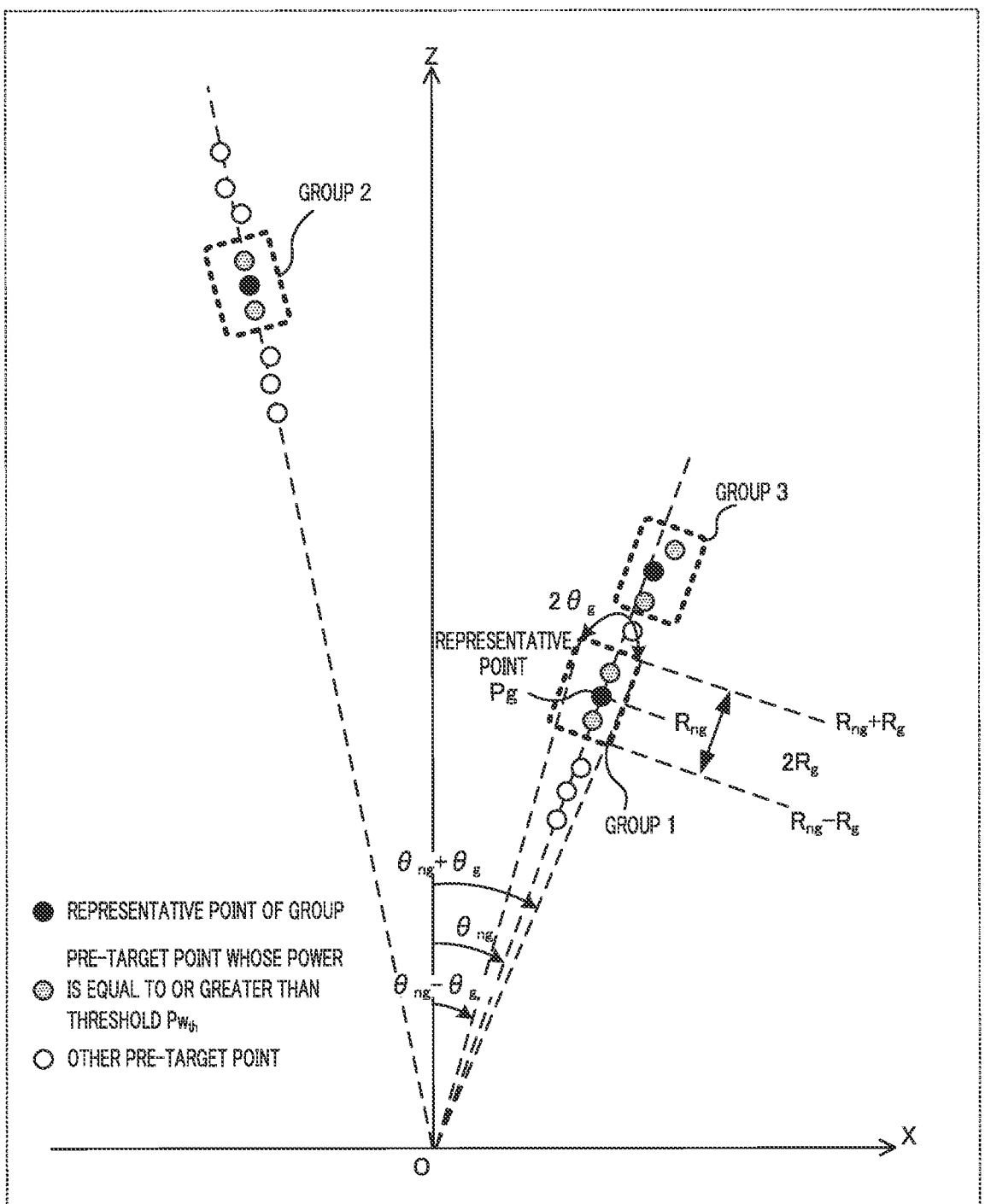
FIG. 10A illustrates a two-dimensional coordinate system used for describing the operation of the range side lobe processor.

FIG. 10A illustrates an example of grouping processing of pre-target points by range side lobe processor 216 in a two-dimensional coordinate system. FIG. 10A is a distance-azimuth two-dimensional map after FFT processing, where horizontal axis x is the azimuth direction and vertical axis z is the distance direction.

For example, range side lobe processor 216 sets one of pre-target points, whose power $Pw_{nt}$ is equal to or greater than a threshold, as representative point Pg of a group. In FIG. 10A, three groups (groups 1, 2 and 3) are set. In each group, a pre-target point whose power $Pw_{nt}$ is the largest may be set as representative point Pg.

Range side lobe processor 216 determines whether a difference between distance $R_{ng}$ to representative point Pg of each group and distance $R_{nt}$ to other pre-target points $P_{nt}$ (for example, N−1 pieces of pre-target points) is within threshold distance "Rg" (in other words, $|R_{ng}-R_{nt}| \leq Rg$).

Next, range side lobe processor 216 determines whether the differences in relative velocity v (not illustrated), azimuth angle θ (not illustrated), and elevation angle φ (not illustrated) between representative point Pg and other pre-target points $P_{nt}$ are within threshold velocity $v_g$, threshold azimuth $\theta_g$, threshold elevation angle $\varphi_g$ ($|v_{ng}-v_{nt}| \leq v_g$, $|\theta_{ng}-\theta_{nt}| \leq \theta g$ and $|\varphi_{ng}-\varphi_{nt}| \leq \varphi g$), respectively.

For example, range side lobe processor 216 causes pre-target point $P_{nt}$ to be included in the group of representative point Pg in a case where all $|R_{ng}-R_{nt}| \leq R_g$, $|v_{ng}-v_{nt}| \leq v_g$, $|\theta_{ng}-\theta_{nt}| \leq \theta_g$, and $|\varphi_{ng}-\varphi_{nt}| \leq \varphi_g$ are satisfied. On the other hand, for example, range side lobe processor 216 does not cause pre-target point $P_{nt}$ to be included in the group of representative point Pg in a case where any one of $|R_{ng}-R_{nt}| \leq R_g$, $|v_{ng}-v_{nt}| \leq v_g$, $|\theta_{ng}-\theta_{nt}| \leq \theta_g$, and $|\varphi_{ng}-\varphi_{nt}| \leq \varphi_g$ is not satisfied.

Here, parameters (for example, threshold) used for grouping may be set in accordance with, for example, the main lobe width in a distance direction or in a speed direction. Note that, the distance direction or the speed direction is a distance direction or a speed direction on a distance-speed two-dimensional map obtained after FFT processing of a pre-target point. Note that, the main lobe width can be uniquely determined by parameters (window function, the number of FFT points, and the like) for signal processing when the distance and the speed are determined.

Figure 9:
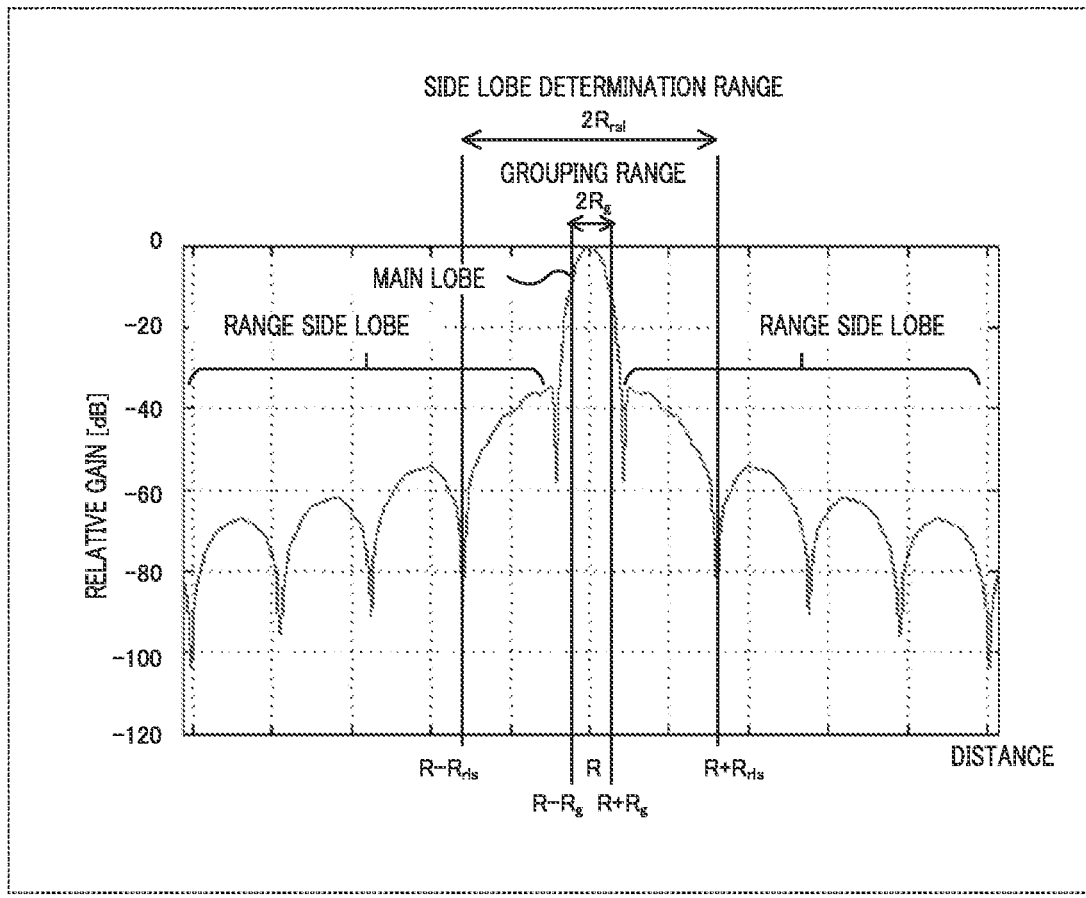
FIG. 9 illustrates an example of parameters of the range side lobe processor.

In threshold distance $R_g$ used for grouping, the value of $2R_g$ may be set to be approximately the same as the width of the main lobe in the distance direction as illustrated in FIG. 9, for example. Similarly, in threshold speed $v_g$ used for grouping, $2_{vg}$ may be set to be approximately the same as the width of the main lobe in the speed direction (not illustrated). Note that, the characteristics illustrated in FIG. 9 are determined in advance by the FFT point number and the window function in signal processor 207b.

Further, it is assumed that the direction of arrival of a pre-target point cloud in the same group is similar. Accordingly, threshold azimuth angle $\theta_g$ and threshold elevation angle $\theta_g$ that are used for grouping may be set to be, for example, values of approximately ⅟10 of the beamwidth formed by the beamformer method with respect to the virtual reception array. Note that, the values of threshold azimuth angle $\theta_g$ and threshold elevation angle $\theta_g$ are not limited to the values of ⅟10 of the beamwidth.

Thus, for example, range side lobe processor 216 groups pre-target points of a pre-target point cloud (in other words, point cloud data) detected by target detector 215 into one group. The pre-target points are each pre-target point (in other words, point data) whose power $Pw_{nt}$ is equal to or greater than a threshold, and each pre-target point (in other words, point data) in which at least a difference from estimated distance $R_{ng}$ to the representative point is within threshold $R_g$ and a difference(s) from an estimated direction(s) (for example, at least one of $\theta_{ng}$ and $\varphi_{ng}$) to the representative point is/are within a threshold(s)(for example, at least one of $\theta_g$ and $\varphi_g$).

In other words, pre-target points included in a main lobe in the distance direction and the speed direction are grouped into the same group. The representative point (for example, a pre-target point whose power Pw is the largest) of each group corresponds to, for example, a target (in other words, the main lobe). Note that, the representative point of each group is not limited to the pre-target point whose power Pw is the largest, but may be any other pre-target point.

Note that, the grouping processing of a pre-target point cloud is not limited thereto, and may group a pre-target point cloud in a main lobe in the distance direction and the speed direction.

Further, range side lobe processor 216 may set, of a pre-target point cloud grouped into one group, for example, a pre-target point, whose power $Pw_{nt}$ is the largest, as representative point Pg of the group. For example, in a case where a pre-target point whose power is greater than that of representative point Pg of a group is grouped, range side lobe processor 216 may set the pre-target point to a new representative point of the group (in other words, update the representative point). Note that, in a case where one pre-target point is included in a group, range side lobe processor 216 sets the pre-target point as the representative point of the group.

Range side lobe processor 216 determines whether every grouping of pre-target points whose power $Pw_{nt}$ is equal to or greater than a threshold is completed (S103). In a case where every grouping of pre-target points whose power $Pw_{nt}$ is equal to or greater than the threshold is not completed (S103: No), range side lobe processor 216 performs the processing in S102 again. In a case where every grouping of pre-target points whose power $Pw_{nt}$ is equal to or greater than the threshold is completed (S103: Yes), range side lobe processor 216 performs the processing in S104.

With the above, range side lobe processor 216, for example, sets Ng pieces of groups ng (ng=1 to Ng).

Note that, in grouping processing on the remaining pre-target points of pre-target points whose power $Pw_{nt}$ is equal to or greater than a threshold, range side lobe processor 216 may not perform grouping processing on pre-target points included in a first group.

Range side lobe processor 216 performs range side lobe component determination on any one of pre-target points (in other words, point data) included in a group. For example, range side lobe processor 216 performs range side lobe determination on representative point $Pg_{ng}$ (for example, a pre-target point whose power Pw is the largest) in group ng (ng=1 to Ng) (S104). In other words, range side lobe processor 216 does not perform the range side lobe determination on other pre-target points which are included in group ng and which differ from representative point $Pg_{ng}$.

Thus, range side lobe processor 216 is capable of reducing the number of pre-target points to be subjected to the range side lobe determination. In other words, range side lobe processor 216 is capable of preventing the range side lobe determination from being performed on a plurality of pre-target point clouds included in the same main lobe in an overlapping manner. Accordingly, it is possible to reduce the processing amount of the range side lobe determination by range side lobe processor 216.

<Range Side Lobe Determination>

For example, in an estimated direction to representative point Pg (in other words, a target) of each group in pre-target point cloud (in other words, point cloud data) $P_{nt}$, range side lobe processor 216 determines each pre-target point (in other words, point data), in which a difference from distance Rg to representative point Pg is within threshold $R_{rsl}$, as a range side lobe component with respect to representative point Pg. For example, range side lobe processor 216 determines any other pre-target point, in which a difference from an estimated direction to representative point Pg of each group and a difference from estimated distance Rg to representative point Pg are within threshold $R_{rsl}$, as a range side lobe component with respect to representative point Pg. In other words, range side lobe processor 216 determines a pre-target point whose estimated direction is the same as that of a target and whose distance is different from that of the target as a range side lobe of the target.

For example, range side lobe processor 216 compares information (for example, distance $R_{ng}$, relative velocity $v_{ngsl}$, azimuth angle $\theta_{ng}$ and elevation angle $\varphi_{ng}$) on representative point $Pg_{ng}$ of each group with information (for example, distance $R_{nt}$, relative velocity $v_{nt}$, azimuth angle $\theta_{nt}$, and elevation angle $\varphi_{ng}$) on another pre-target point cloud $P_{nt}$ (for example, N−1 pieces of pre-target points). For example, range side lobe processor 216 determines whether differences between the parameters of representative point $Pg_{ng}$ and the parameters of the other pre-target point cloud $P_{nt}$ are within ranges of thresholds (for example, distance $R_{rsl}$, relative velocity $v_{rsl}$, azimuth angle $\theta_{rsl}$ and elevation angle $\varphi_{rsl}$) (for example, $|R_{ng}-R_{nt}|\le R_{rsl}$, $|v_{ng}-v_{nt}|\le v_{rsl}$, $|\theta_{ng}-\theta_{nt}|\le \theta_{rsl}$, and $|\varphi_{ng}-\varphi_{nt}|\le \varphi_{rsl}$).

For example, range side lobe processor 216 determines pre-target point $P_{nt}$ satisfying all of $|R_{ng}-R_{nt}|\le R_{rsl}$, $|v_{ng}-v_{nt}|\le v_{rsl}$, $|\theta_{ng}-\theta_{nt}|\theta_{rsl}$, and $|\varphi_{ng}-\varphi_{nt}|\le \varphi_{rsl}$ as a range side lobe component with respect to representative point $P_{gng}$ (in other words, a target). Note that, Group 2 in FIG. 10A is not determined as a range side lobe component of Group 1.

Note that, in a case where the representative point of a group is determined as a range side lobe of the representative point of another group, range side lobe processor 216 determines that the point whose power is smaller is a range side lobe component of the representative point whose power is larger. Here, in FIG. 10A (or FIG. 10B to be described later), the representative point of Group 3 is determined as a range side lobe of Group 1. Further, for example, in a case where the power of the representative point of Group 2 is smaller than the power of the representative point of Group 1, Group 2 is determined as a range side lobe.

For example, to pre-target point $P_{nt}$ determined as a range side lobe, range side lobe processor 216 may set a flag indicating that pre-target point $P_{nt}$ is the range side lobe (hereinafter, referred to as "range side lobe flag").

Here, of the thresholds (for example, $R_{rsl}$, $v_{rsl}$, $\theta_{rsl}$, and $\varphi_{rsl}$) used in the range side lobe determination, distance $R_{rls}$ may be set as, for example, a distance in which a range side lobe in a distance axis direction may occur. For example, as illustrated in FIG. 9, the value of $R_{rls}$ may be set in ranges in which the first side lobes are determined as range side lobes. Note that, the ranges determined as range side lobes are not limited to the first side lobes, but may be other ranges (for example, the second or subsequent side lobes). Further, the position at which a range side lobe appears in the distance axis direction may be determined, for example, depending on the method of signal processing in radar apparatus 10.

Further, speed $v_{rsl}$ may be, for example, approximately the same as relative velocity $v_g$ of representative point $Pg_{ng}$ of a group. Thus, range side lobe processor 216 can determine a range side lobe with respect to a main lobe corresponding to the relative velocity of representative point $Pg_{ng}$ of the group in the speed direction.

Similarly, azimuth angle $\theta_{rls}$ and elevation angle $\varphi_{rsl}$ may be, for example, approximately the same as azimuth angle $\theta_g$ and elevation angle $\varphi_g$ of representative point $Pg_{ng}$ of a group, or approximately a beamwidth formed by the virtual reception array. Thus, range side lobe processor 216 can determine a range side lobe in the direction of arrival of representative point $Pg_{ng}$ of the group.

In FIG. 8, range side lobe processor 216 determines whether the range side lobe determination on representative points $Pg_{ng}$ of every group is completed (S105). In a case where the range side lobe determination on representative points $Pg_{ng}$ of every group is not completed (S105: No), range side lobe processor 216 performs the processing in S104 again. In a case where the range side lobe determination on representative points $Pg_{ng}$ of every group is completed (S105: Yes), range side lobe processor 216 terminates the processing.

The operation example of range side lobe processor 216 illustrated in FIG. 8 has been described thus far.

Figure 10B:
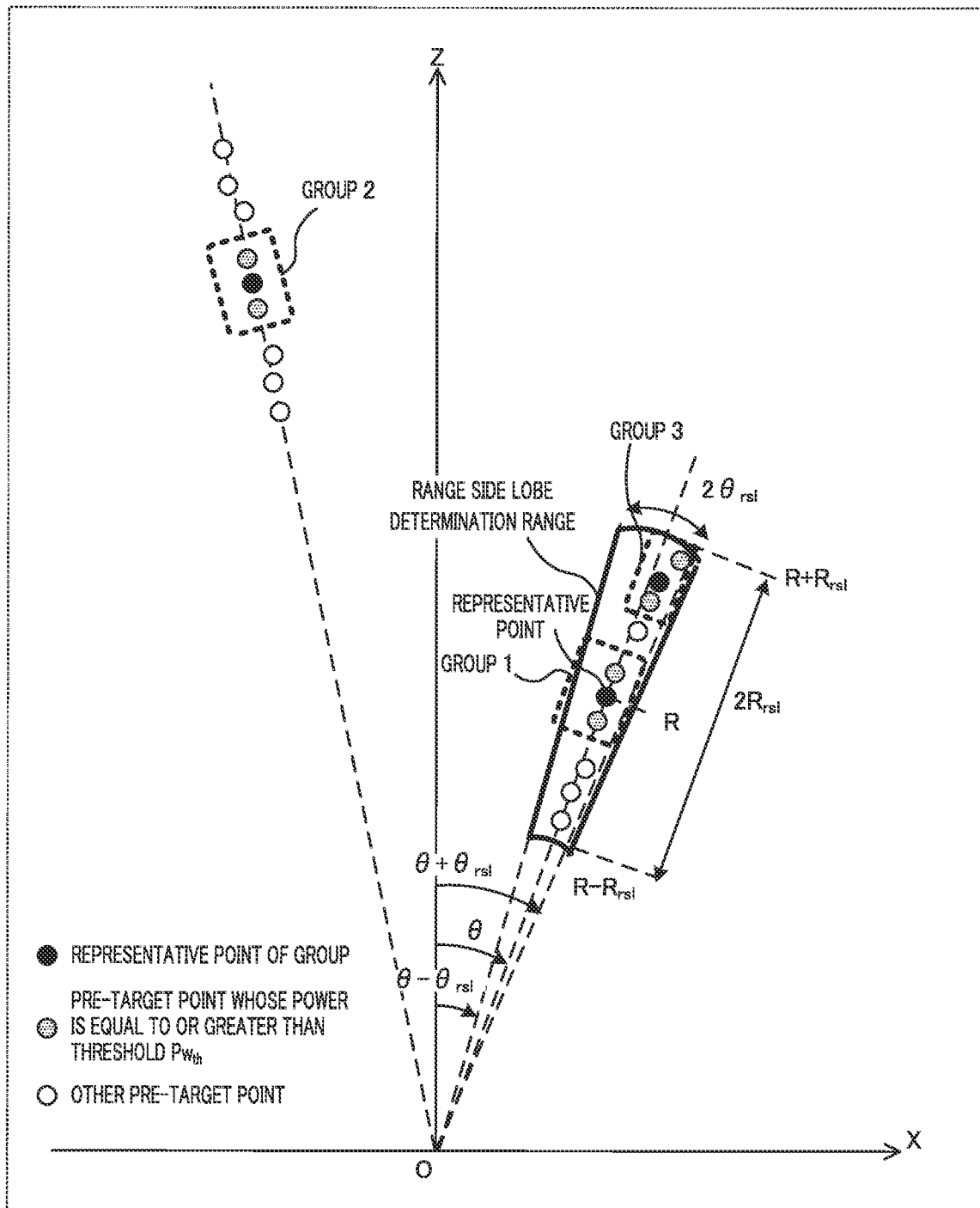
FIG. 10B illustrates a two-dimensional coordinate system used for describing the operation of the range side lobe processor.

Next, FIG. 10B illustrates an example of range side lobe determination processing of range side lobe processor 216 in a two-dimensional (azimuth-distance) coordinate system. For simplifying the description, FIG. 10B uses a two-dimensional display with an X-Z plane as an example, and a Y plane is omitted. Further, FIG. 10C illustrates an example of the range side lobe determination processing of range side lobe processor 216 in a three-dimensional (azimuth-elevation-distance) coordinate system.

Figure 10C:
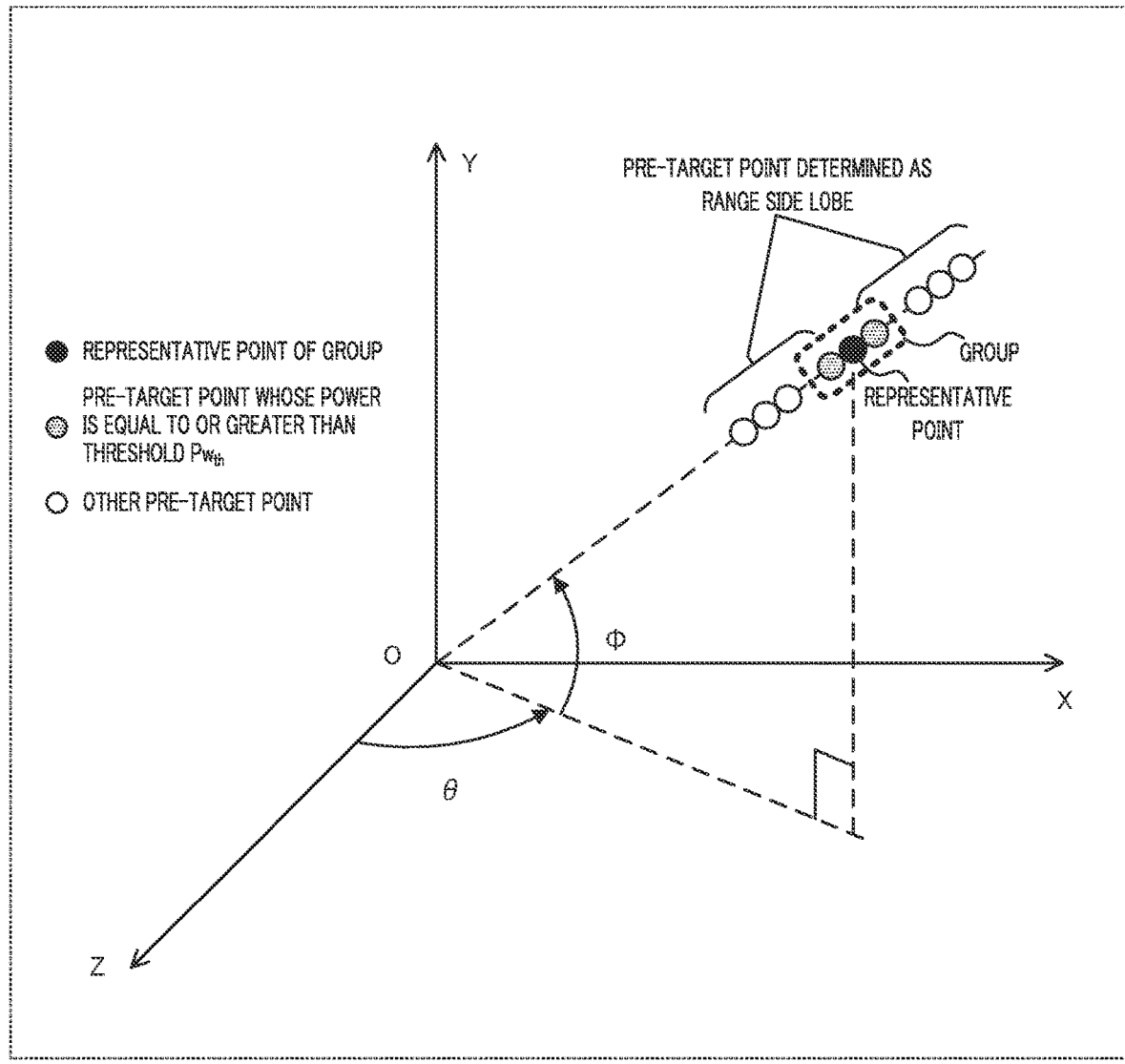
FIG. 10C illustrates a three-dimensional coordinate system used for describing the operation of the range side lobe processor.

FIGS. 10B and 10C illustrate examples of point cloud data (in other words, pre-target point clouds) of reflected waves detected by target detector 215. For example, the point cloud data may include information on estimated distance, direction, and power of each individual point data (in other words, pre-target point) forming the point cloud data. Further, the point cloud data may also include information on the relative velocity of each individual point data with respect to radar apparatus 10 in addition to the estimated distance, direction, and power.

As illustrated in FIGS. 10B and 10C, range side lobe processor 216 first groups pre-target points whose power $Pw_{nt}$ is equal to or greater than threshold power $Pw_{th}$. In FIGS. 10B and 10C, one representative point of a group and two pre-target points into one group.

As illustrated in FIGS. 10B and 10C, even in a case where a plurality of pre-target points whose power $Pw_{nt}$ is equal to or greater than a threshold exists, range side lobe processor 216 determines these pre-target points included in the same group as a pre-target point cloud corresponding to the same main lobe. Then, range side lobe processor 216 performs the range side lobe determination on the representative point of the grouped pre-target points. In other words, range side lobe processor 216 does not perform the range side lobe determination on the other pre-target points different from the representative point included in the group.

Next, as illustrated in FIGS. 10B and 10C, range side lobe processor 216 determines whether a pre-target point exists in a range side lobe determination range with respect to the representative point of the group (in other words, the main lobe). In the example illustrated in FIG. 10B, the range side lobe determination range with respect to the representative point of the group is a range of $|R_{ng}-R^{nt}|\le R_{rsl}$ and $|\theta_{ng}-\theta_{nt}|\le \theta_{rsl}$. Further, in the example illustrated in FIG. 10C, the range side lobe determination range for the representative point of the group is a range of $|R_{ng}-R_{nt}|\le R_{rsl}$, $|\theta_{ng}-\theta_{nt}|\le \theta_{rsl}$, and $|\varphi_{ng}-\varphi_{nt}|\le \varphi_{rsl}$. Note that, range side lobe determination range $R_{rsl}$ is set from calculated values or values measured in advance as illustrated in FIG. 9, and is determined as a range in which a range side lobe may occur. In FIG. 9, the range includes up to the first range side lobes, but may be determined depending on the SNR and the range side lobe level.

Figure 11A:
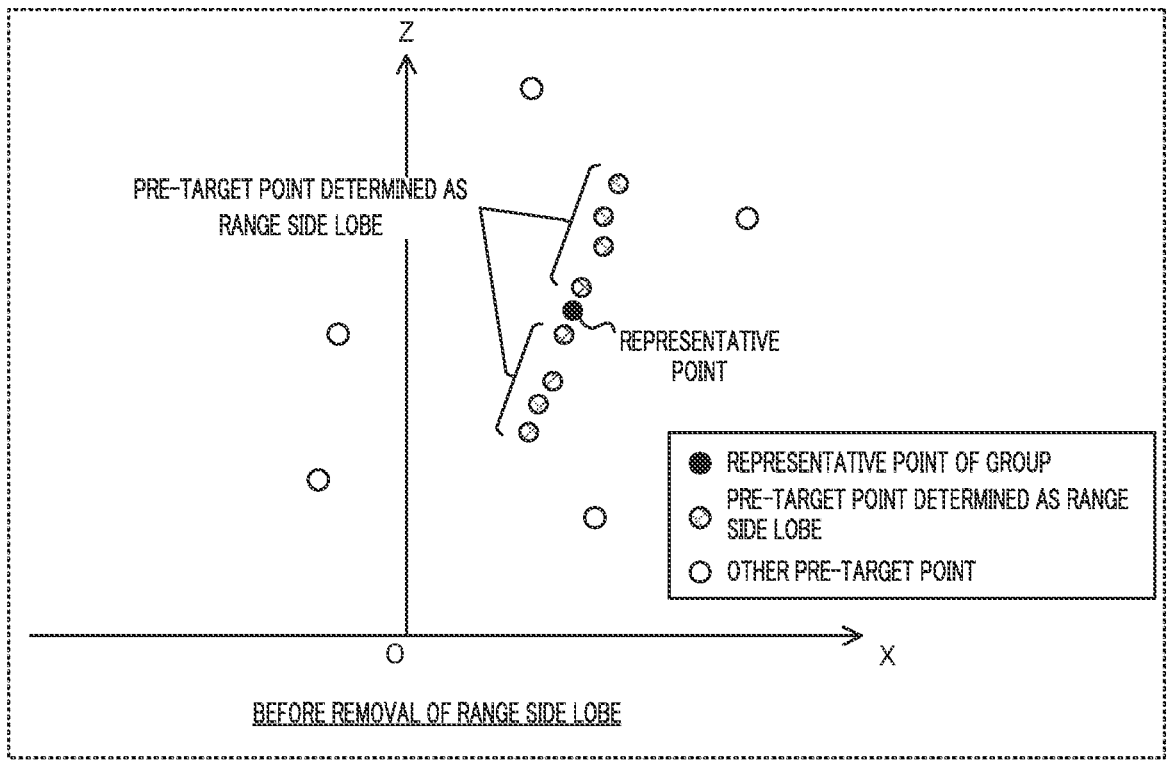
FIG. 11A illustrates an example of a range side lobe determination result of the range side lobe processor.
Figure 11B:
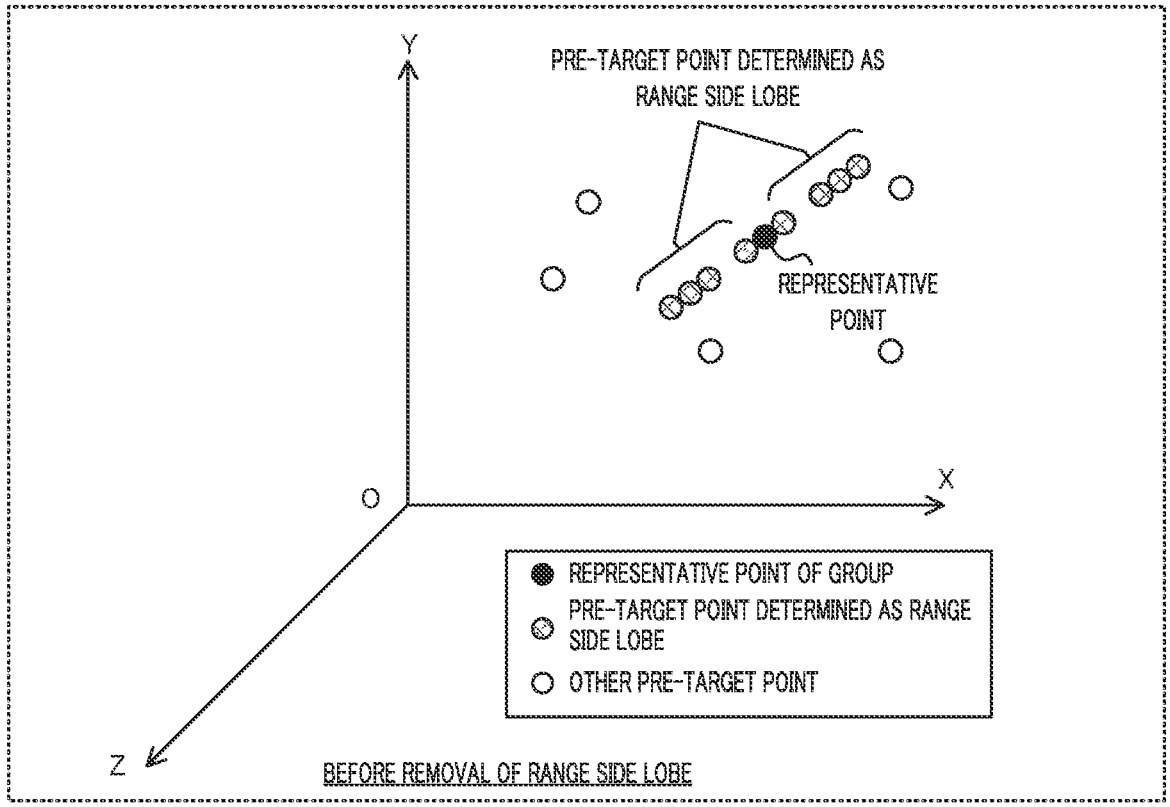
FIG. 11B illustrates an example of a range side lobe determination result of the range side lobe processor.

Then, as illustrated in FIGS. 11A and 11B, range side lobe processor 216 determines pre-target points included in the range side lobe determination range with respect to the representative point of the group as a range side lobe.

Figure 12A:
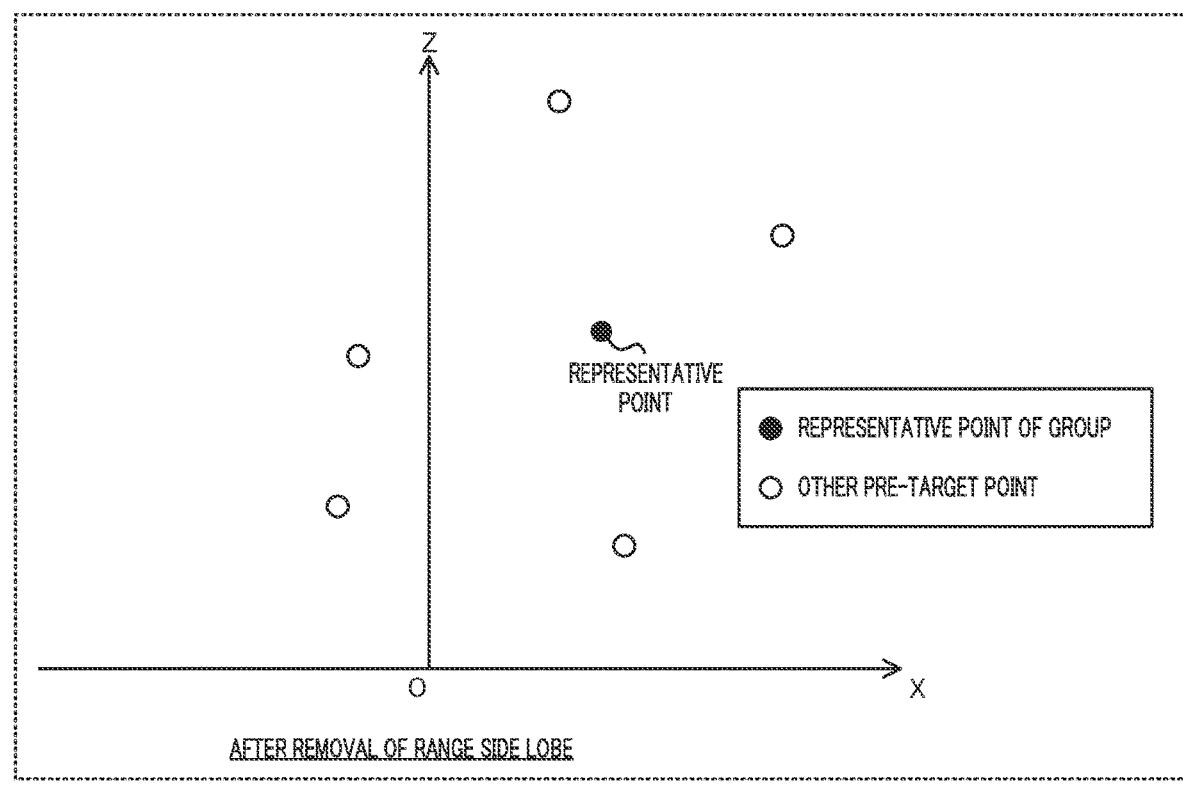
FIG. 12A illustrates an example of range side lobe removal processing.
Figure 12B:
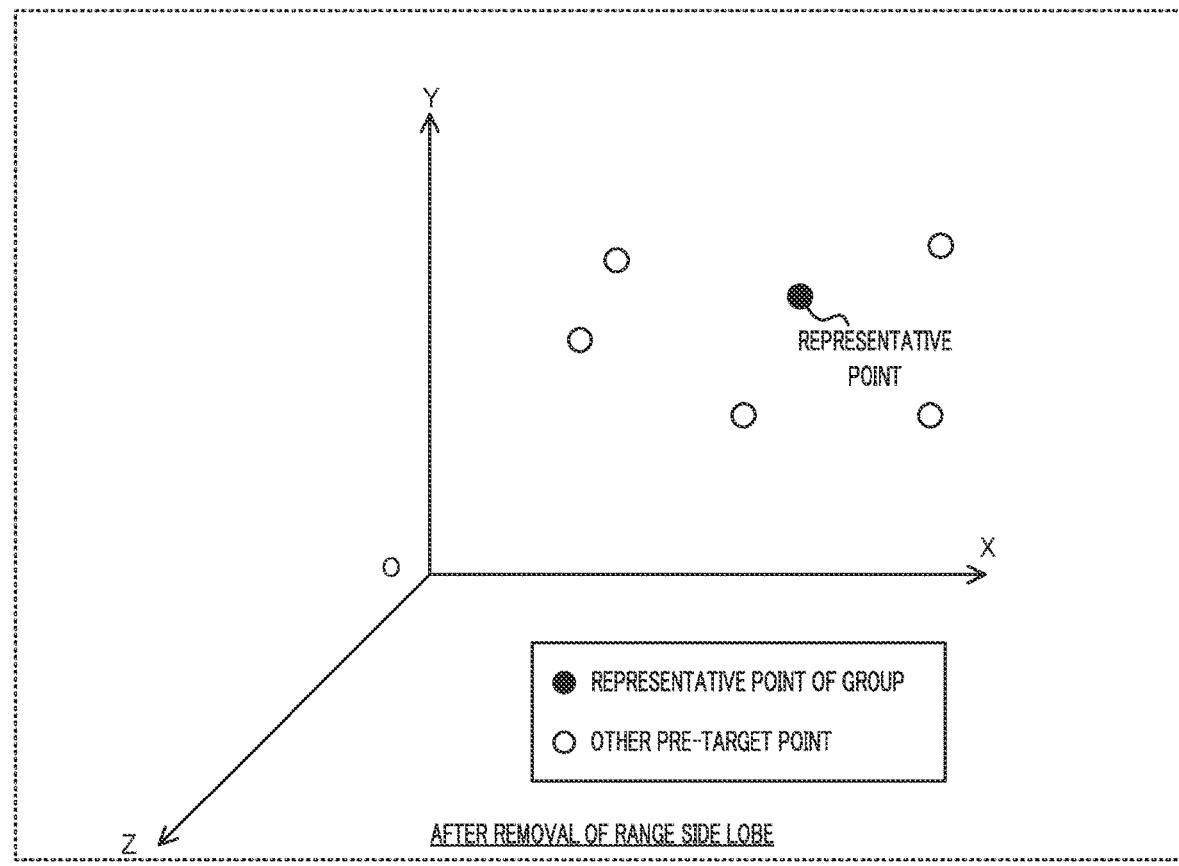
FIG. 12B illustrates an example of the range side lobe removal processing.

For example, as illustrated in FIGS. 12A and 12B, range side lobe processor 216 may remove the pre-target points determined as the range side lobe in FIGS. 11A and 11B. For example, range side lobe processor 216 outputs target information on a pre-target point (for example, the representative point) different from the pre-target points determined as the range side lobe to a processor of radar apparatus 10 at a subsequent stage (for example, a software processor that performs clustering, tracking, object identification, or the like).

Alternatively, range side lobe processor 216 may cause information (for example, a range side lobe flag), which indicates whether each pre-target point of a pre-target point cloud of N pieces of pre-target points is a range side lobe component, to be included in target information. Range side lobe processor 216 may output the target information including the range side lobe flag to a processor of radar apparatus 10 at a subsequent stage (for example, a software processor that performs clustering, tracking, object identification, or the like). In other words, range side lobe processor 216 may not remove a pre-target point determined as a range side lobe.

Here, in two-dimensional positioning, it is possible to position one of the azimuth angle and the elevation angle in addition to the distance. Accordingly, of azimuth angles and elevation angles, even w % ben angles that can be positioned are the same, angles that are difficult to position may be different with respect to determination of the directions of arrival of a target (or a main lobe) and a range side lobe in the two-dimensional positioning, for example. In three-dimensional positioning, on the other hand, the distance, the azimuth angle, and the elevation angle in every direction can be positioned. Accordingly, the three-dimensional positioning has a higher determination accuracy of the directions of arrival of a target (or a main lobe) and a range side lobe than the two-dimensional positioning. Accordingly, the three-dimensional positioning has a higher range side lobe determination accuracy in comparison with the two-dimensional positioning.

Accordingly, for example, in a case where the three-dimensional positioning is supported in radar apparatus 10 as illustrated in FIG. 10B, range side lobe processor 216 may output target information after removal of a range side lobe as illustrated in FIG. 12B to a processor at a subsequent stage. Thus, for example, the processor of radar apparatus 10 at the subsequent stage is capable of performing processing using the target information from which the range side lobe is removed. In other words, the processor of radar apparatus 10 at the subsequent stage is capable of reducing the influence of the range side lobe and performing processing on the target.

On the other hand, for example, in a case where the two-dimensional positioning is supported in radar apparatus 10 as illustrated in FIG. 10A (in other words, in a case where the three-dimensional positioning is not supported), range side lobe processor 216 may output target information including a range side lobe flag to a processor of radar apparatus 10 at a subsequent stage. The processor of radar apparatus 10 at the subsequent stage may perform, based on the range side lobe flag, for example, processing such as clustering, tracking, or object identification based on a pre-target point that may be a range side lobe.

Note that, range side lobe processor 216 may output target information including a range side lobe flag to a processor at a subsequent stage not only in a case where the two-dimensional positioning is supported in radar apparatus 10, but also in a case where, for example, the three-dimensional positioning is supported and the positioning accuracy of one or both of the azimuth angle and the elevation angle however deteriorates.

The operation example of range side lobe processor 216 has been described thus far.

As described above, in radar apparatus 10 according to the present embodiment, target detector 215 outputs a plurality of pieces of data each including information in which a distance to a target and a direction to the target are estimated based on a reception signal including a reflected wave that is a radar signal reflected by the target. Further, range side lobe processor 216 determines a range side lobe component with respect to the target based on the estimated distance and the estimated direction of arrival of one or more pieces of data selected from the plurality of pieces of data.

As described above, radar apparatus 10 performs direction-of-arrival estimation processing (in other words, modulation/demodulation during pulse compression) on the target and then performs range side lobe determination with respect to the target based on a direction-of-arrival estimation result.

Here, for example, even when a nonlinear signal occurs in radar transmitter 100 or radar receiver 200 of radar apparatus 10, the corresponding relationship between a target (for example, a main lobe) and a range side lobe in a direction-of-arrival estimation result is hardly affected. Accordingly, even in an environment in which a nonlinear signal occurs in radar apparatus 10, the present embodiment makes it possible to improve the robust property against nonlinear signal generation and to improve the range side lobe determination accuracy. In other words, radar apparatus 10 is capable of reducing range side lobes regardless of modulation/demodulation of radar apparatus 10 or a window function. For example, radar apparatus 10 may use a window function in modulation/demodulation of a signal.

Accordingly, the present embodiment enables radar apparatus 10 to reduce erroneous detection of a target due to a range side lobe.

Note that, the range side lobe determination processing by range side lobe processor 216 is not limited to the processing described above. For example, range side lobe processor 216 may not perform the grouping of pre-target points as illustrated in FIG. 8. For example, range side lobe processor 216 may perform the range side lobe determination on the vicinity (in other words, a range side lobe determination range) of every pre-target point with power Pw equal to or greater than threshold power $P_{Wth}$. In this case, range side lobe processor 216 may determine a pre-target point, whose power is equal to or lower than a predetermined power (for example, threshold power $Pw_{th}$), as a range side lobe among pre-target points included in the range side lobe determination range, for example.

Further, in the foregoing description, a case where range side lobe processor 216 performs the range side lobe determination based on relative velocity information has been described. However, range side lobe processor 216 may perform the range side lobe determination processing without using the relative velocity information. In other words, range side lobe processor 216 may perform the range side lobe determination based on at least information on the distance to a target (in other words, a detected point cloud), the direction of arrival of the target, and the power of the target.

Further, there is a case where another target exists in a distance region where a range side lobe with respect to the representative point (in other words, a target to be determined) of each group exists (for example, a pedestrian present in front of a vehicle). The range side lobe with respect to the target to be determined acts on a result of direction-of-arrival estimation of the target (for example, at least one of azimuth angle $\theta_{rsl}$ and elevation angle $\varphi_{rsl}$). Thus, in this case, the other target may be detected at a position synthesized with the range side lobe with respect to the target to be determined (for example, Group 2 in FIGS. 10A and 10B, and the other pre-target points in FIGS. 12A and 12B).

Accordingly, in range side lobe processor 216, another target may be a pre-target outside a range side lobe determination range with respect to the target to be determined (for example, other than azimuth $\theta_{rsl}$ and elevation $\varphi_{rsl}$) and is therefore hardly erroneously determined as a range side lobe with respect to the target to be determined. This is because, in a case where signal processing is performed on a combined component of a range side lobe and a reflected wave component of the other target, the azimuth angle and the elevation angle of the other target are estimated as an azimuth angle and an elevation angle different from those of a point at which a range side lobe component not including the reflected wave component of the other target occurs so that the probability of the other target becoming outside the determination range (azimuth angle $\theta_{rsl}$ and elevation angle $\varphi_{rsl}$) increases. For example, range side lobe processor 216 may output target information on the other target to a processor at a subsequent stage.

(Variation 1)

The configuration of the radar apparatus according to an aspect of the present disclosure is not limited to the configuration illustrated in FIG. 2. For example, the configuration of radar apparatus 10a illustrated in FIG. 13 may be used. Note that, in FIG. 13, the configuration of radar receiver 200 is the same as in FIG. 2, and thus a detailed configuration thereof is omitted.

In radar apparatus 10 illustrated in FIG. 2, in radar transmitter 100, transmission switch 106 selectively switches an output from radar-transmission-signal generator 101 to one of the plurality of transmission radio sections 107. In radar apparatus 10a illustrated in FIG. 13, on the other hand, in radar transmitter 10a, transmission radio section 107a performs transmission radio processing on an output (a radar transmission signal) from radar-transmission-signal generator 101, and transmission switch 106a selectively switches the output from transmission radio section 107a to one of the plurality of transmission antennas 108.

Figure 13:
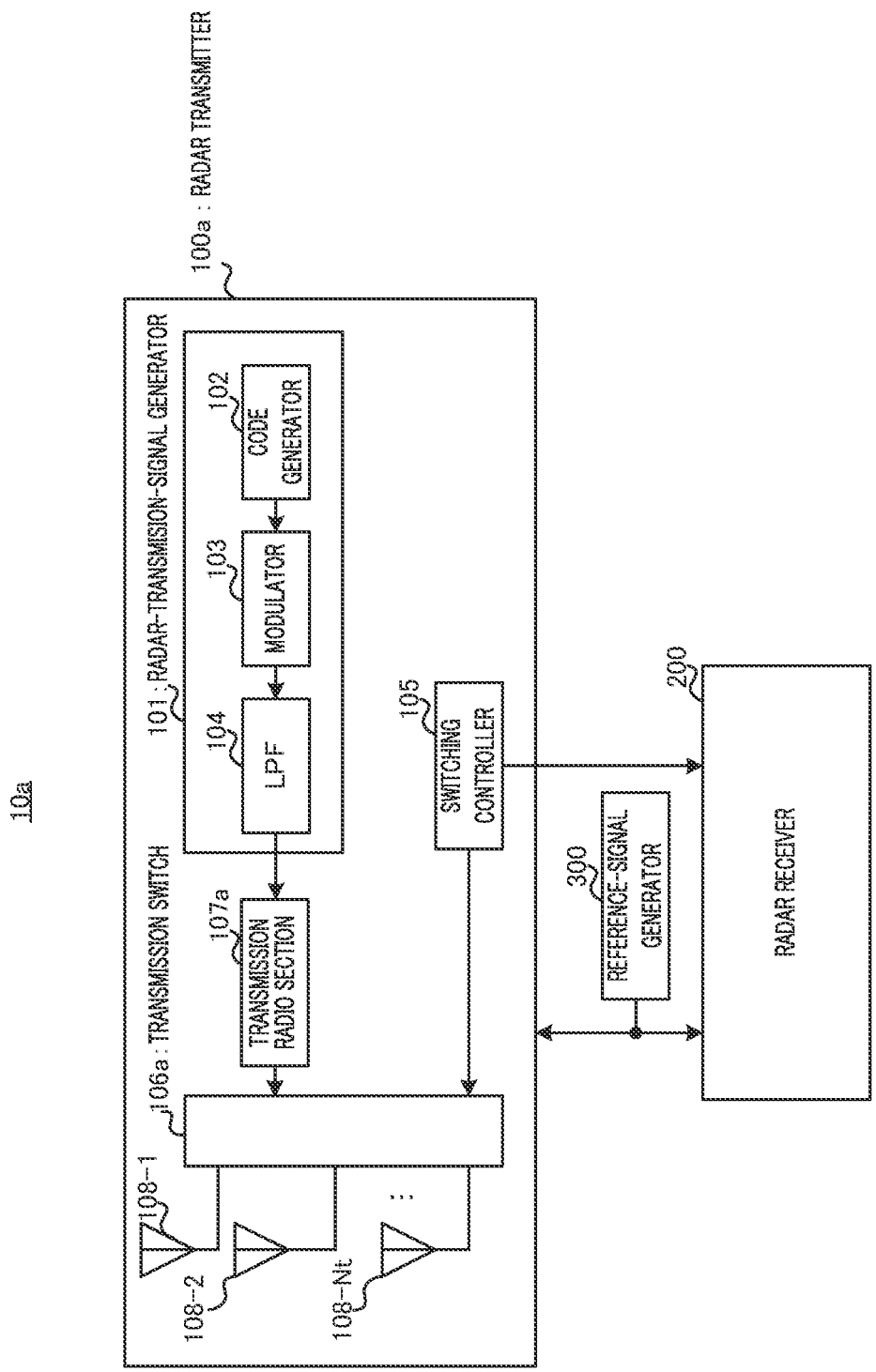
FIG. 13 is a block diagram illustrating a configuration example of a radar apparatus according to Variation 1.

The configuration of radar apparatus 10a illustrated in FIG. 13 also achieves the same effect as in the embodiment described above. Further, Variation 1 makes it possible to reduce the number of transmission radio sections 107 in comparison with the configuration of FIG. 1 so that the size of radar apparatus 10a can be reduced, for example.

(Variation 2)

A case where radar transmitter 100 (or radar transmitter 100a) uses a pulse-compression radar that transmits a phase-modulated or amplitude-modulated pulse train has been described, but the modulation method is not limited thereto. For example, the present disclosure is also applicable to a radar system using frequency-modulated pulse waves, such as chirp pulses.

Figure 14:
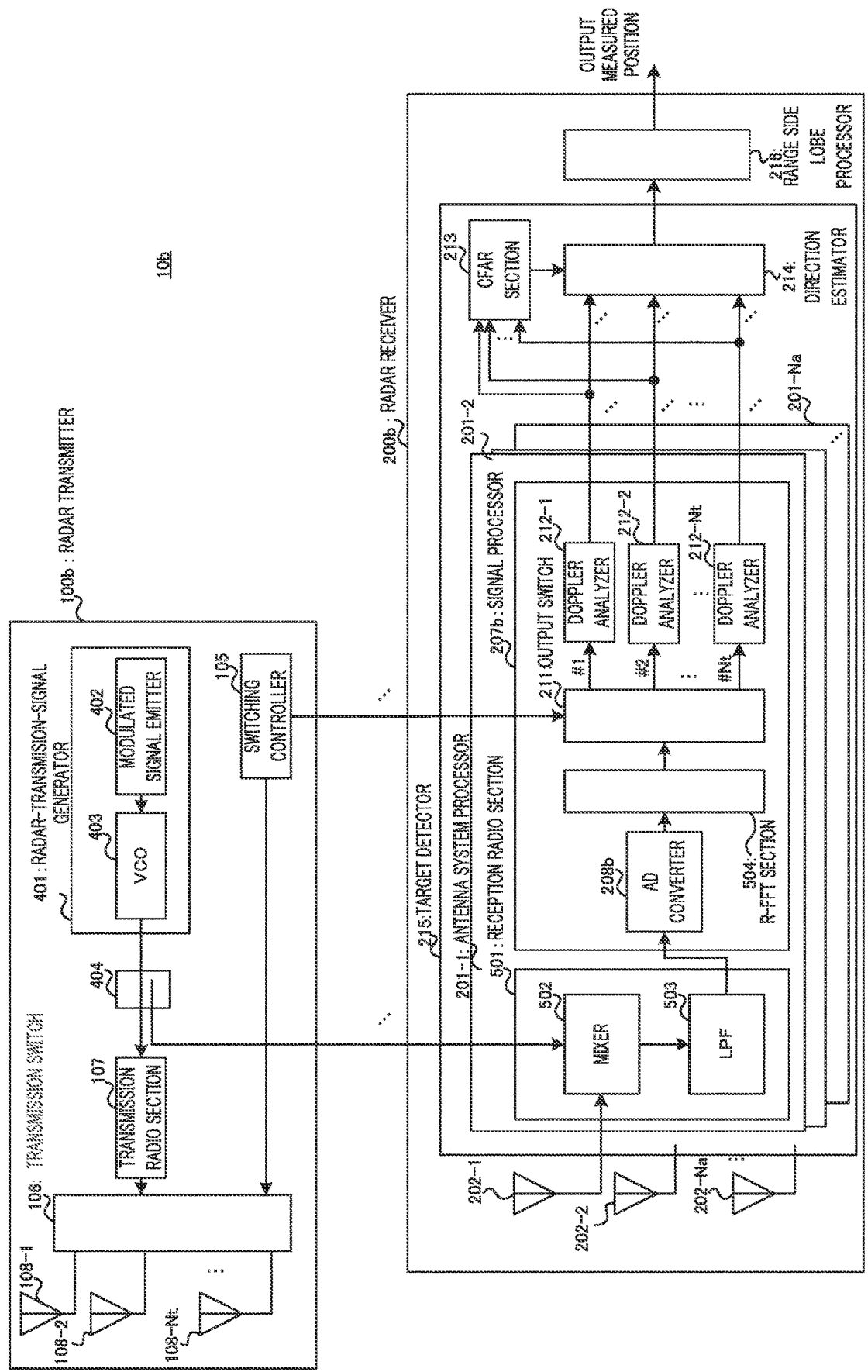
FIG. 14 is a block diagram illustrating a configuration example of a radar apparatus according to Variation 2.

FIG. 14 illustrates an example of a configuration diagram of radar apparatus 10b in a case where a radar system using chirp pulses (for example, fast chirp modulation) is applied. Note that, in FIG. 14, the same configurations as those in FIG. 2 are given the same reference signs, and descriptions thereof will be omitted.

First, transmission processing in radar transmitter 100b will be described.

In radar transmitter 100b, radar-transmission-signal generator 401 includes modulated signal emitter 402 and voltage-controlled oscillator (VCO) 403.

Figure 15:
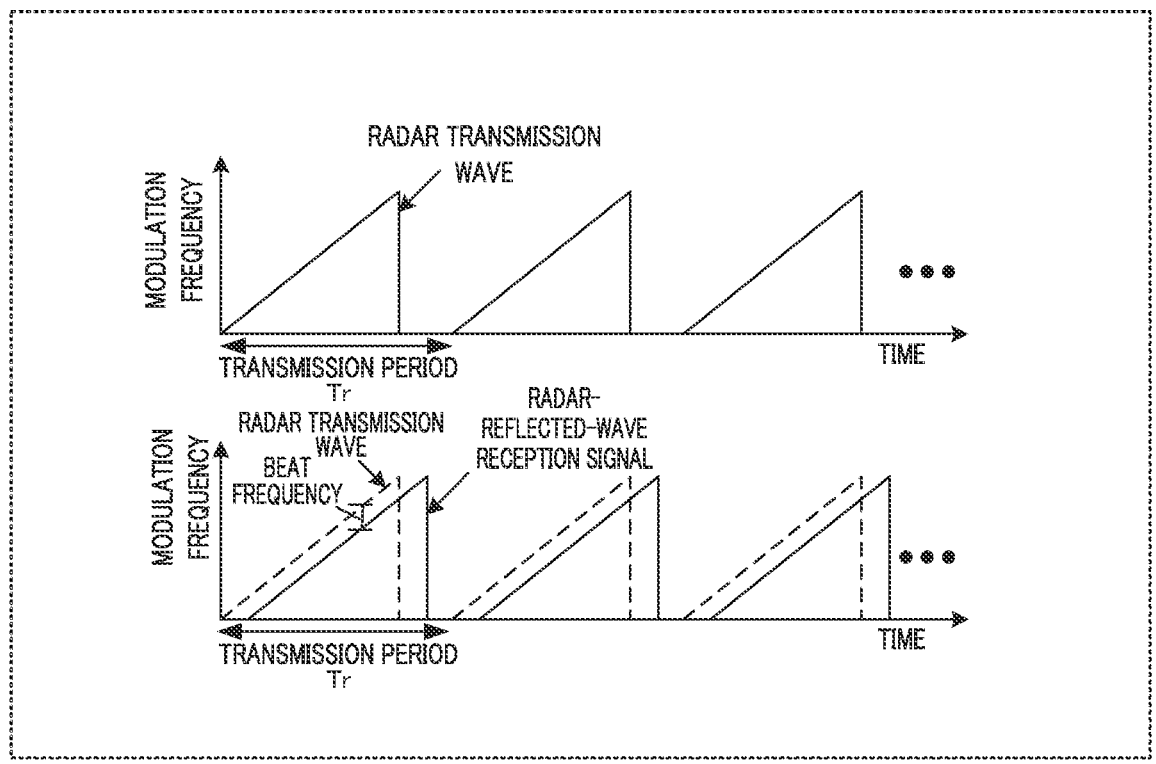
FIG. 15 illustrates examples of a transmission signal and a reflected wave signal in a case where chirp pulses are used.

Modulated signal emitter 402 emits saw-tooth modulated signals periodically as illustrated in FIG. 15, for example, where Tr is the radar transmission period.

VCO 403 outputs a frequency-modulated signal (in other words, a frequency-chirp signal) to transmission radio section 107 on the basis of the radar transmission signal outputted from modulated signal emitter 402. The frequency-modulated signal is amplified by transmission radio section 107 and radiated into space from transmission antenna 108 switched by transmission switch 106. For example, the radar transmission signal is transmitted in a transmission interval of Np (=Nt×Tr) period in each of first transmission antenna 108 to Nt-th transmission antenna 108.

Directional coupler 404 extracts some of the frequency-modulated signals and outputs the signals to reception radio sections 501 (mixers 502) of radar receiver 200b.

Next, reception processing in radar receiver 200b will be described.

Reception radio section 501 of radar receiver 200b mixes the frequency-modulated signal (the signal inputted from directional coupler 404), which is the transmission signal, to a received reflected wave signal with mixer 502 and passes the signal through LPF 503. Thus, a beat signal with a frequency corresponding to the delay time of the reflected wave signal is extracted. For example, as illustrated in FIG. 15, the difference frequency between the frequency of the transmission signal (transmission frequency-modulated wave) and the frequency of the reception signal (reception frequency-modulated wave) is obtained as a beat frequency.

The signal outputted from LPF 503 is converted to discrete sample data by AD converter 208b in signal processor 207b.

R-FFT section 504 performs FFT processing on $N_{data}$ pieces of discrete sample data obtained in a predetermined time range (range gate) for each transmission period Tr. This allows signal processor 207b to output a frequency spectrum in which peaks appear in the beat frequency according to the delay time of the reflected wave signal (radar reflected wave). Note that, in FFT processing, R-FFT section 504 may multiply the data by a window function coefficient, such as Han window or Hamming window. The use of the window function coefficient makes it possible to suppress side lobes generated around the beat frequency peaks.

A beat frequency spectrum response outputted from R-FFT section 504 of z-th signal processor 207b, obtained by the M-th chirp pulse transmission, is expressed as AC_RFT$_z$(fb, M), where fb is the index number (pin number) of FFT, and fb=0, . . . , $N_{data}$/2. The smaller frequency index fb is, the smaller the delay time of the reflected wave signal (in other words, the closer the distance to the target) of the beat frequency is.

As in the embodiment described above, for example, based on the switching control signal inputted from switching controller 105, output switch 211 in z-th signal processor 207b selectively switches to one of Nt pieces of Doppler analyzers 212 and outputs the output of R-FFT section 504 in each radar transmission period Tr to selected Doppler analyzer 212.

Hereinafter, as an example, a switching control signal in M-th radar transmission period Tr[M] is expressed as Nt-bit information [bit$_1$(M), bit$_2$(M), ..., bit$_{Nt}$(M)]. For example, in a case where ND-th bit$_{ND}$(M) (where ND=one of 1 to Nt) in the switching control signal in M-th radar transmission period Tr[M] is '1', output switch 211 selects (in other words, switches on) ND-th Doppler analyzer 212. In contrast, in a case where ND-th bit$_{ND}$(M) in the switching control signal in M-th radar transmission period Tr[M] is '0', output switch 211 does not select (in other words, switches off) ND-th Doppler analyzer 212. Output switch 211 outputs the signal inputted from R-FFT section 504 to selected Doppler analyzer 212.

As described above, each Doppler analyzer 212 is sequentially selected and turned on in a period of Np(=Nt×Tr). The switching control signal repeats the above content Nc times.

Note that, the transmission signal transmission start time in each transmission radio section 107 may not be synchronized with period Tr. For example, each transmission radio section 107 may start transmission of the radar transmission signal at the transmission start time with different transmission delays $\Delta_1, \Delta_2, \ldots, \Delta Nt$.

Z-th (z=1, ..., Na) signal processor 207b includes Nt pieces of Doppler analyzers 212.

Doppler analyzer 212 performs Doppler analysis on the output from output switch 211 for each beat frequency index $f_b$.

For example, in a case where Nc is a power of 2, fast Fourier transform (FFT) processing can be applied to the Doppler analysis.

The w-th output of ND-th Doppler analyzer 212 of z-th signal processor 207b indicates Doppler frequency response FT_CI$_z^{(ND)}$(fb, $f_u$, w) of Doppler frequency index $f_u$ in beat frequency index $f_b$, as expressed in the following equation.

(Equation 20)

$$FT\_CI_z^{(ND)}(f_b, f_u, w) = \sum_{q=0}^{N_t N_c - 1} bit_{N_D}(q+1) AC\_RFT_z(f_b, N_t N_c(w-1) + q+1) \exp\left[-j\frac{2\pi \left\lfloor \frac{q}{N_t}\right\rfloor f_u}{N_c}\right] \quad [20]$$

where ND=1 to Nt, ND=1 to Nt, w is an integer equal to or greater than 1, j is an imaginary unit, and z=1 to Na.

Processing of CFAR section 213 and direction estimator 214 downstream of signal processor 207b is an operation in which discrete time k described in the embodiment is replaced with beat frequency index $f_b$ so that a detailed description thereof will be omitted.

With the above-described configurations and operations, the configuration in Variation 2 also achieves the same effects as in the embodiment.

Further, beat frequency index $f_b$ described above may be converted into distance information and outputted. Beat frequency index fb may be converted to distance information R(fb) using the following equation.

(Equation 21)

$$R(fb) = \frac{C_0}{2B_w} f_b \quad [21]$$

where $B_w$ is the frequency modulation bandwidth of a frequency-chirp signal generated through frequency modulation, and $C_0$ is the light speed.

Embodiments according to an exemplary embodiment of the present disclosure have been described above.

The operations according to the embodiments and variations may be performed in combination as appropriate.

Further, in radar apparatuses 10, 10a, and 10b (for example, see FIGS. 2, 13, and 14), radar transmitter 100 and radar receiver 200 may be individually disposed at physically isolated places. Further, in radar receiver 200 (for example, see FIGS. 2, 13, and 14), direction estimator 214 and other constituent elements may be individually disposed at physically isolated places.

Radar apparatuses 10, 10a, and 10b include, for example, a central processing unit (CPU), a storage medium such as a read only memory (ROM) that stores a control program, and a work memory such as a random access memory (RAM), which are not illustrated. In this case, the functions of the sections described above are implemented by the CPU executing the control program. However, the hardware configuration of radar apparatuses 10, 10a, and 10b is not limited to that in this example. For example, the functional sections of radar apparatuses 10, 10a, and 10b may be implemented as an integrated circuit (IC). Each functional section may be formed as an individual chip, or some or all of them may be formed into a single chip.

The notation " ... section" or "-er, -or, and -ar" used for each component in the embodiments described above may be replaced with another notation such as " ... circuitry", " ... device", " ... unit" or " ... module".

Various embodiments have been described with reference to the drawings hereinabove. Obviously, the present disclosure is not limited to these examples. Obviously, a person skilled in the art would arrive at variations and modification examples within a scope described in claims, and it is understood that these variations and modifications are within the technical scope of the present disclosure. Further, each component of the above-mentioned embodiments may be combined optionally without departing from the spirit of the disclosure.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a field programmable gate array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology, Biotechnology can also be applied.

The present disclosure can be realized by any kind of apparatus, device or system having a function of communication, which is referred to as a communication apparatus. Some non-limiting examples of such a communication apparatus include a phone (e.g. cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof. The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

SUMMARY OF THE PRESENT DISCLOSURE

A radar apparatus according to one embodiment of the present disclosure includes: an estimation circuit that outputs a plurality of pieces of data each including information in which a distance to a target and a direction to the target are estimated based on a reception signal including a reflected wave that is a radar signal reflected by the target, and a processing circuit that determines a range side lobe component in the target based on the estimated distance and the estimated direction of one or more pieces of data selected from the plurality of pieces of data.

In one embodiment of the present disclosure, the processing circuit determines another piece of data as the range side lobe component. The other piece of data is a piece of data in which each of a difference from the estimated direction of the selected one or more pieces of data and a difference from the estimated distance of the selected one or more pieces of data is within a first threshold.

In one embodiment of the present disclosure, each of the plurality of pieces of data includes information on power, the processing circuit groups one or more pieces of data into one or more groups, where the one or more pieces of data are one or more pieces of data in which the power is equal to or greater than a second threshold and the one or more groups are one or more groups in which each of the difference from the estimated distance and the difference from the estimated direction is within a third threshold, and the processing circuit sets one piece of the one or more pieces of data included in the one or more groups as the selected one or more pieces of data.

In one embodiment of the present disclosure, each of the plurality of pieces of data includes information on a relative velocity with respect to the radar apparatus, and the processing circuit determines the range side lobe component based on the relative velocity in addition to the estimated distance and the estimated direction.

In one embodiment of the present disclosure, the processing circuit outputs information on a piece of data different from the other piece of data that has been determined as the range side lobe component among the plurality of pieces of data.

In one embodiment of the present disclosure, the processing circuit outputs information indicating whether each of the plurality of pieces of data is the range side lobe component.

In one embodiment of the present disclosure, the estimated direction is one or both of an azimuth angle and an elevation angle.

In one embodiment of the present disclosure, the radar apparatus further includes a transmission antenna and a reception antenna, where the transmission antenna is used to transmit the radar signal, the reception antenna is used to receive the reflected wave, and one or both of the transmission antenna and the reception antenna include a plurality of antenna elements.

In one embodiment of the present disclosure, the plurality of antenna elements is arranged on a two-dimensional plane.

A method for determining a range side lobe according to one embodiment of the present disclosure includes: outputting a plurality of pieces of data each including information in which a distance to a target and a direction to the target are estimated based on a reception signal including a reflected wave that is a radar signal reflected by the target; and determining a range side lobe component in the target based on the estimated distance and the estimated direction of one or more pieces of data selected from the plurality of pieces of data.

The disclosure of Japanese Patent Application No. 2019-059166, filed on Mar. 26, 2019, including the specification, drawings and abstract, is incorporated herein by reference in its entirety.

INDUSTRIAL APPLICABILITY

The present disclosure is suitable as a radar apparatus that detects a target.

REFERENCE SIGNS LIST

10, 10b, 10c Radar apparatus
100, 100a, 100b Radar transmitter
200, 200b Radar receiver
300 Reference-signal generator
101, 101a, 401 Radar-transmission-signal generator
102 Code generator
103 Modulator
104, 503 LPF
105 Switching controller
106, 106a Transmission switch 107, 107a Transmission radio section
108 Transmission antenna
111 Code storage
112 DA converter
201 Antenna system processor
202 Reception antenna
203, 501 Reception radio section
204 Amplifier
205 Frequency converter
206 Quadrature detector
207, 207b Signal processor
208, 209 AD converter
210 Correlation calculator
211 Output switch
212 Doppler analyzer
213 CFAR section
214 Direction estimator
402 Modulated signal emitter
403 VCO
404 Directional coupler
502 Mixer

The invention claimed is:

1. A radar apparatus, comprising:
an estimation circuit that outputs a plurality of pieces of data each including information in which a distance to a target and a direction to the target are estimated based on a reception signal including a reflected wave that is a radar signal reflected by the target, the radar signal being transmitted by the radar apparatus, and information on a relative velocity with respect to the radar apparatus; and
a processing circuit that determines a range side lobe component in the target based on the estimated distance, the estimated direction of one or more pieces of data selected from the plurality of pieces of data and the relative velocity.

2. The radar apparatus according to claim 1,
wherein the processing circuit determines another piece of data as the range side lobe component, the other piece of data being a piece of data in which each of a difference from the estimated direction of the selected one or more pieces of data and a difference from the estimated distance of the selected one or more pieces of data is within a first threshold.

3. The radar apparatus according to claim 2, wherein:
each of the plurality of pieces of data includes information on power,
the processing circuit groups one or more pieces of data into one or more groups, the one or more pieces of data being one or more pieces of data in which the power is equal to or greater than a second threshold, the one or more groups being one or more groups in which each of the difference from the estimated distance and the difference from the estimated direction is within a third threshold, and
the processing circuit sets one piece of the one or more pieces of data included in the one or more groups as the selected one or more pieces of data.

4. The radar apparatus according to claim 2,
wherein the processing circuit outputs information on a piece of data different from the other piece of data that has been determined as the range side lobe component among the plurality of pieces of data.

5. The radar apparatus according to claim 1,
wherein the processing circuit outputs information indicating whether each of the plurality of pieces of data is the range side lobe component.

6. The radar apparatus according to claim 1,
wherein the estimated direction is one or both of an azimuth angle and an elevation angle.

7. The radar apparatus according to claim 1, further comprising:
a transmission antenna and a reception antenna, the transmission antenna being used to transmit the radar signal, the reception antenna being used to receive the reflected wave, one or both of the transmission antenna and the reception antenna including a plurality of antenna elements.

8. The radar apparatus according to claim 7,
wherein the plurality of antenna elements is arranged on a two-dimensional plane.

9. A method for determining a range side lobe, comprising:
outputting a plurality of pieces of data each including information in which a distance to a target and a direction to the target are estimated based on a reception signal including a reflected wave that is a radar signal reflected by the target, the radar signal being transmitted by the radar apparatus, and information on a relative velocity with respect to the radar apparatus; and
determining a range side lobe component in the target based on the estimated distance, the estimated direction of one or more pieces of data selected from the plurality of pieces of data and the relative velocity.

* * * * *